US006687680B1

(12) United States Patent
Iguchi et al.

(10) Patent No.: US 6,687,680 B1
(45) Date of Patent: Feb. 3, 2004

(54) ELECTRONIC CASH REGISTER SYSTEM

(75) Inventors: Kesayoshi Iguchi, Fujisawa (JP);
Hiroyuki Tanaka, Yokohama (JP);
Masanobu Shigeno, Machida (JP);
Takashi Kondoh, Yokohama (JP);
Kazuya Murakami, Kawasaki (JP);
Toshiaki Aoki, Yokohama (JP);
Hidenori Endoh, Yokohama (JP); Seigo Ozaki, Yokohama (JP); Tetsuya Kojima, Kawasaki (JP); Yoshio Ishibashi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 325 days.

(21) Appl. No.: 09/620,905

(22) Filed: Jul. 20, 2000

(30) Foreign Application Priority Data

Jul. 26, 1999 (JP) .......................... 11-210968

(51) Int. Cl.[7] .............................. G06F 17/60
(52) U.S. Cl. .................. 705/16; 705/21; 705/24; 705/25; 235/7 R; 235/383
(58) Field of Search .................. 705/15, 16, 23, 705/414, 416, 24, 25, 21; 235/7 R, 12, 15, 380, 375, 383

(56) References Cited

U.S. PATENT DOCUMENTS

| | | | | |
|---|---|---|---|---|
| 4,661,908 A | * | 4/1987 | Hamano et al. | 705/23 |
| 4,843,547 A | | 6/1989 | Fuyama et al. | |
| 5,083,638 A | * | 1/1992 | Schneider | 186/61 |
| 5,115,888 A | * | 5/1992 | Schneider | 186/61 |
| 5,375,680 A | * | 12/1994 | Ikeda et al. | 235/383 |
| 5,377,097 A | * | 12/1994 | Fuyama et al. | 705/15 |
| 5,589,676 A | * | 12/1996 | Iguchi | 235/7 R |
| 5,864,824 A | | 1/1999 | Iguchi et al. | |
| 6,085,167 A | * | 7/2000 | Iguchi | 705/15 |
| 6,115,695 A | * | 9/2000 | Kern | 705/23 |
| 6,155,486 A | * | 12/2000 | Lutz | 235/383 |
| 6,168,076 B1 | * | 1/2001 | Yamamoto et al. | 705/16 |
| 6,384,348 B1 | * | 5/2002 | Haga et al. | 235/383 |

FOREIGN PATENT DOCUMENTS

DE 31 44 897 A1 * 5/1983 ............. 235/383

OTHER PUBLICATIONS

Frable, Foster Jr "Improving Cashier Productivity In Self–Service Operations," Dec. 9, 1996, Nation's Restaurant News, v30n48, pp: 58, 62.*

* cited by examiner

Primary Examiner—Robert P. Olszewski
Assistant Examiner—Lynda Jasmin
(74) Attorney, Agent, or Firm—Louis Woo

(57) ABSTRACT

Weight data of articles for sale is stored and a total weight is calculated every order. Measured weight of the prepared articles in a package is compared with the calculated total weight. If the measured weight substantially disagrees with the calculated total weight, error information is provided to the operator to correctly package the articles. Comparison may be effected every order number. An addition flag may be further stored with weight data every article to indicate that the article is a target of weight measuring. A non-addition key indicating that the corresponding article is not packaged may be further provided. When the non-addition key is depressed, the weight of the corresponding article is not included in the total weight. The total weight may be printed on the receipt, so that the operator can compare the printed total weight with the measured weight. The total weight may be printed with bar codes. A balance has a bar code reader for comparison. The bar code reader may be provided to the electronic cash register. A controller communicating with the electronic cash register may be further provided at a kitchen for comparison. The order number may be printed on a receipt read by a bar code reader. The controller has a monitor display for informing the error. The difference in weight may be further displayed.

11 Claims, 37 Drawing Sheets

FIG. 3

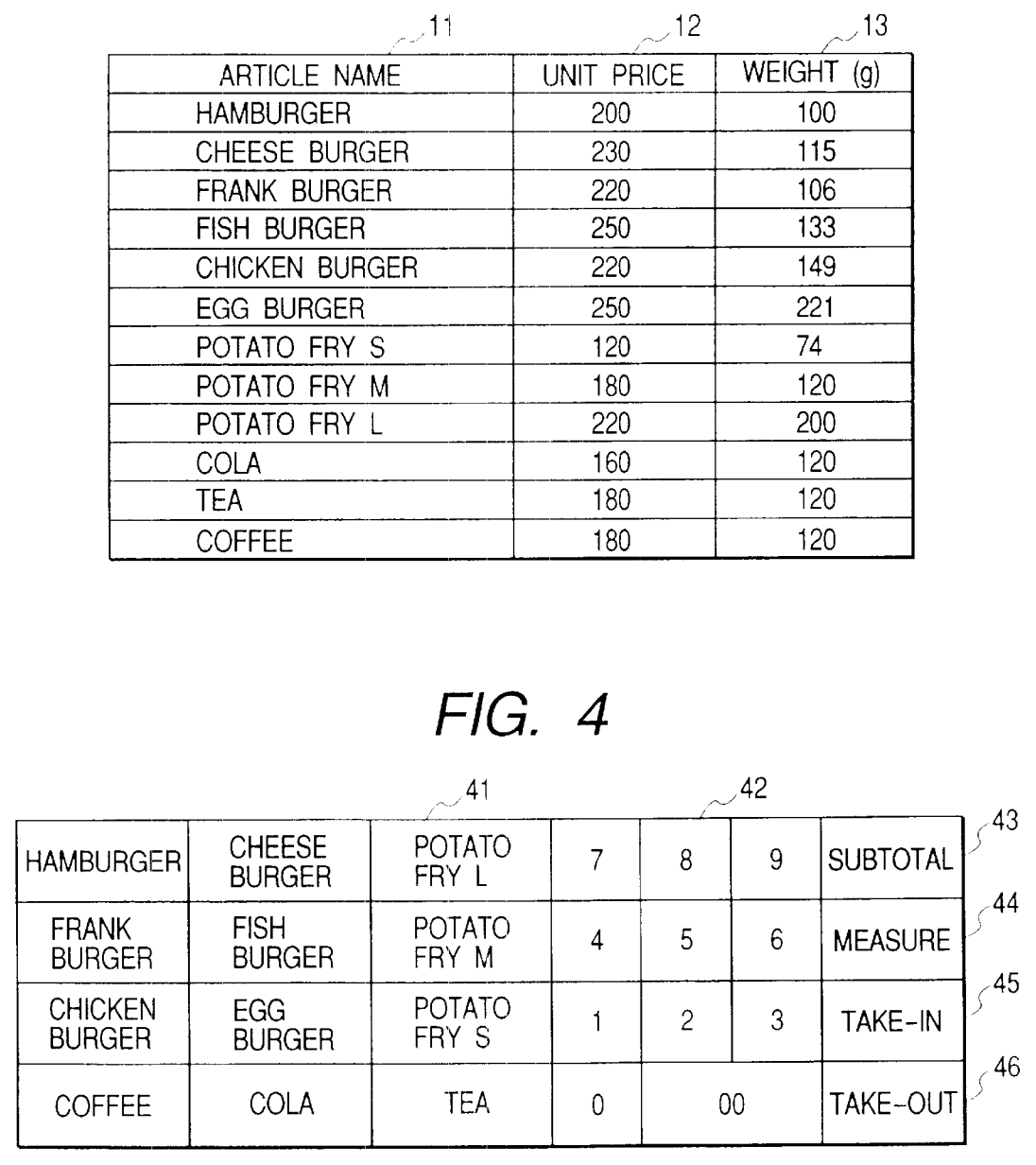

| ARTICLE NAME | UNIT PRICE | WEIGHT (g) |
|---|---|---|
| HAMBURGER | 200 | 100 |
| CHEESE BURGER | 230 | 115 |
| FRANK BURGER | 220 | 106 |
| FISH BURGER | 250 | 133 |
| CHICKEN BURGER | 220 | 149 |
| EGG BURGER | 250 | 221 |
| POTATO FRY S | 120 | 74 |
| POTATO FRY M | 180 | 120 |
| POTATO FRY L | 220 | 200 |
| COLA | 160 | 120 |
| TEA | 180 | 120 |
| COFFEE | 180 | 120 |

FIG. 4

| HAMBURGER | CHEESE BURGER | POTATO FRY L | 7 | 8 | 9 | SUBTOTAL |
|---|---|---|---|---|---|---|
| FRANK BURGER | FISH BURGER | POTATO FRY M | 4 | 5 | 6 | MEASURE |
| CHICKEN BURGER | EGG BURGER | POTATO FRY S | 1 | 2 | 3 | TAKE-IN |
| COFFEE | COLA | TEA | 0 | 00 | | TAKE-OUT |

FIG. 5

HAMBURGER ~41

CHEESE BURGER ~41

POTATO FRY M ~41

COLA ~41

SUBTOTAL ~43

1000  TAKE-OUT ~46

PUT ON

MEASURE ~44

FIG. 7
| ORDER NO. | TOTAL W (g) |
|---|---|
| 1234 | 540 |
| 1260 | 550 |
| 1261 | 550 |
| ⋮ | ⋮ |
| 1280 | 300 |
|  |  |
|  |  |
|  |  |
FIG. 8
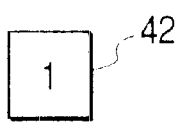
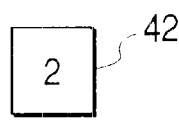
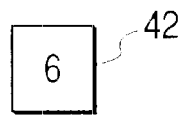

FIG. 10

| ARTICLE NAME | UNIT PRICE | WEIGHT (g) | ADD FLG |
|---|---|---|---|
| HAMBURGER | 200 | 100 | 1 |
| CHEESE BURGER | 230 | 115 | 1 |
| FRANK BURGER | 220 | 106 | 1 |
| FISH BURGER | 250 | 133 | 1 |
| CHICKEN BURGER | 220 | 149 | 1 |
| EGG BURGER | 250 | 221 | 1 |
| POTATO FRY S | 120 | 74 | 1 |
| POTATO FRY M | 180 | 120 | 1 |
| POTATO FRY L | 220 | 200 | 1 |
| COLA | 160 | 120 | 0 |
| TEA | 180 | 120 | 0 |
| COFFEE | 180 | 120 | 0 |

| HAMBURGER | CHEESE BURGER | POTATO FRY L | 7 | 8 | 9 | SUBTOTAL |
|---|---|---|---|---|---|---|
| FRANK BURGER | FISH BURGER | POTATO FRY M | 4 | 5 | 6 | MEASURE |
| CHICKEN BURGER | EGG BURGER | POTATO FRY S | 1 | 2 | 3 | TAKE-IN |
| COFFEE | COLA | TEA | 0 | 00 | NON-ADD | TAKE-OUT |

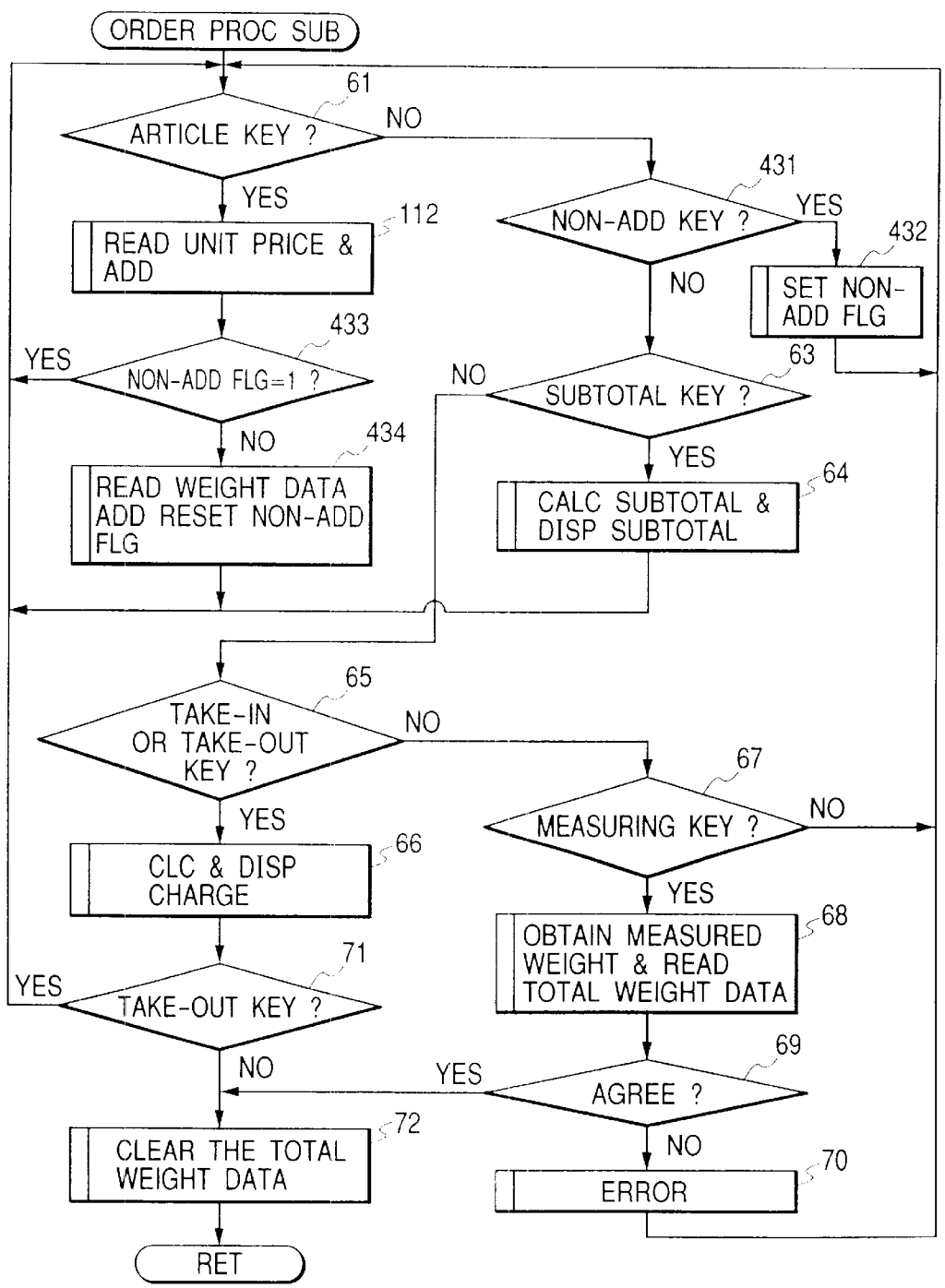

```
1999-2-26      #1234

1   HAMBURGER

1   CHEESE BURGER

1   POTATO FRY M

1   COLA

SUBTOTAL      770

TAX            23

TOTAL         793

DEPOSIT     1,000

CHANGE        207

WEIGHT       455g
```

```
1999-2-26      #1234

1    HAMBURGER

1    CHEESE BURGER

1    POTATO FRY M

1    COLA

SUBTOTAL        770

TAX              23

TOTAL           793

KEEPING       1,000

CHANGE          207

WEIGHT
```

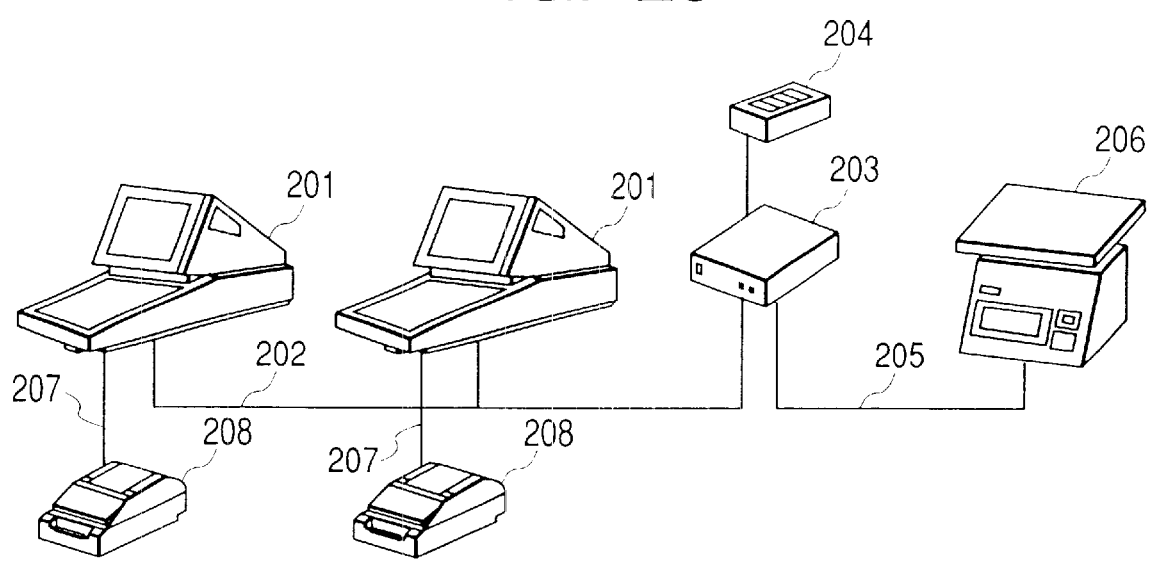

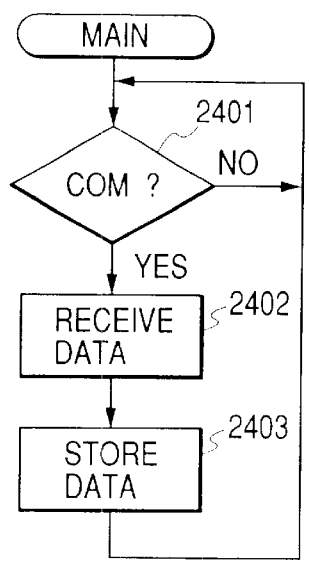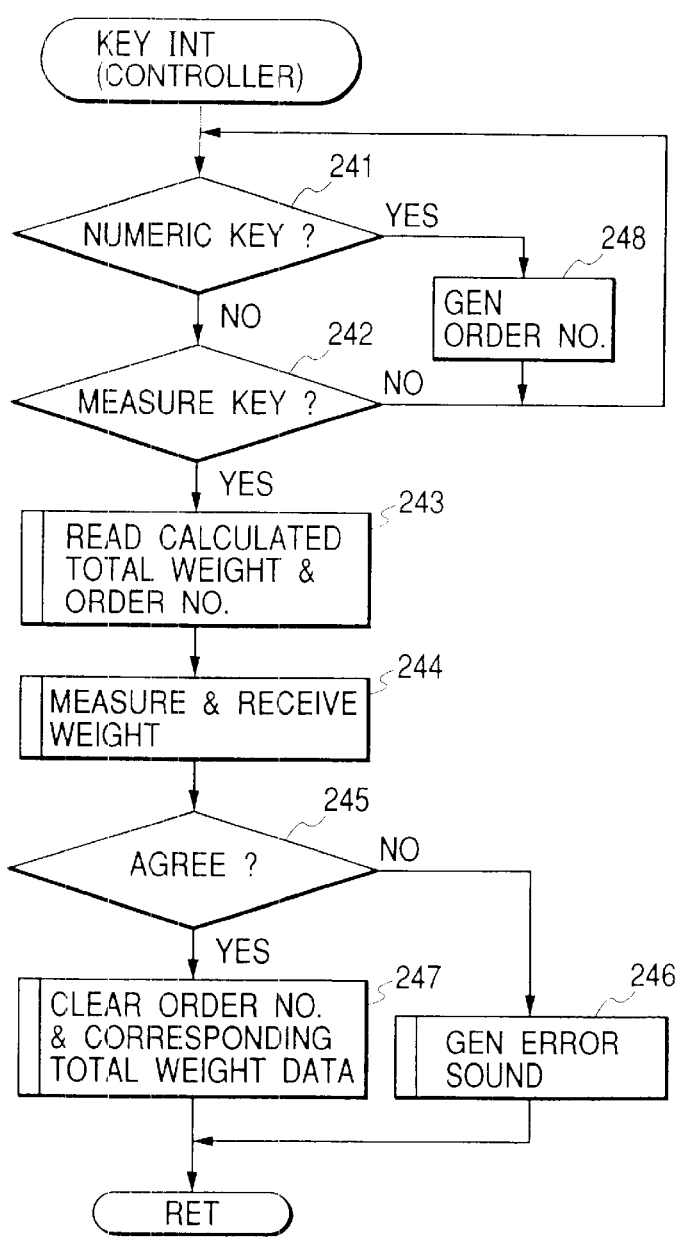

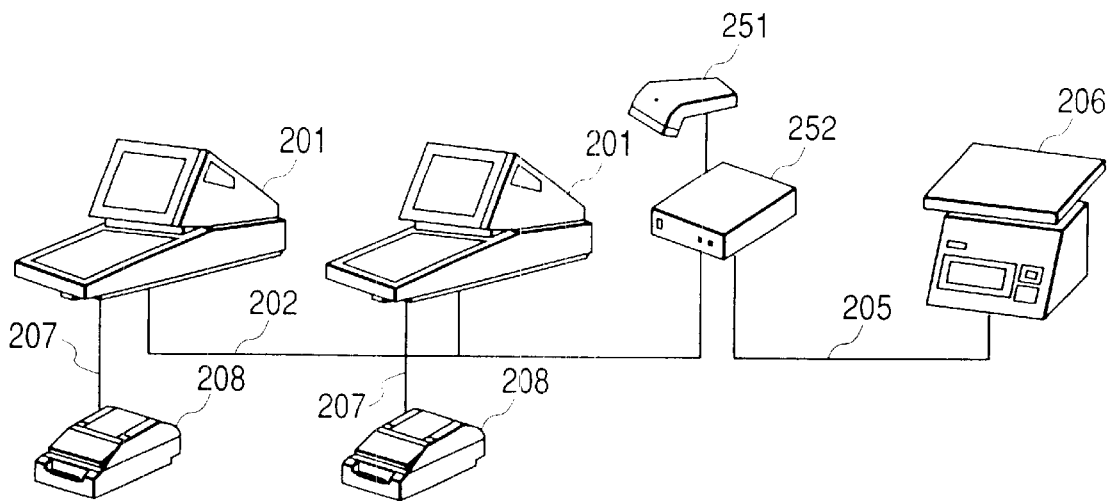

FIG. 29
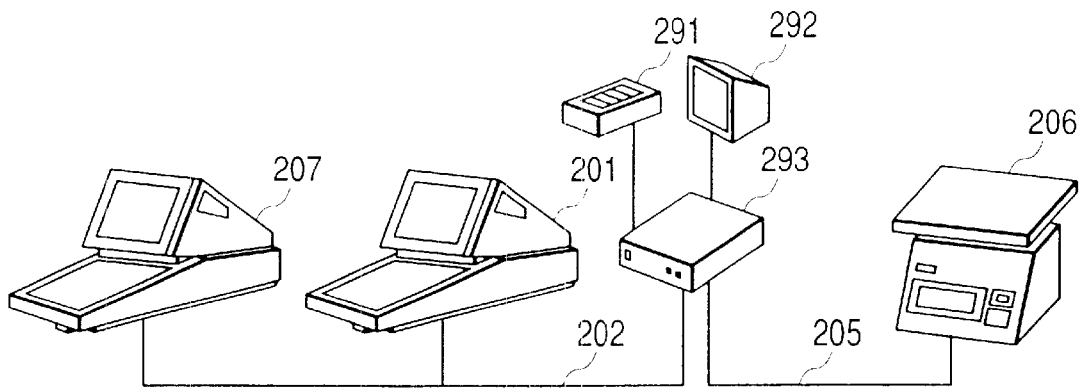
FIG. 30
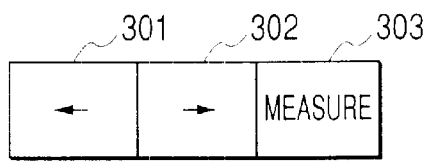
FIG. 31
| #1234 | #1264 | #1265 |
|---|---|---|
| 2 CHEESE BURGER | 2 POTATO M | 3 CHEESE BURGER |
| 1 HAMBURGER | 1 TEA | 1 COLA |
| 1 COFFEE | 1 HOT TEA | 1 COFFEE |
| 2 COLA | | |

| #1234 | #1264 | #1265 |
|---|---|---|
| 2 CHEESE BURGER | 2 POTATO M | 3 CHEESE BURGER |
| 1 HAMBURGER | 1 TEA | 1 COLA |
| 1 COFFEE | 1 HOT TEA | 1 COFFEE |
| 2 COLA | | |
| ** DISAGREE | | |

FIG. 36

| #1234 | #1264 | #1265 |
|---|---|---|
| 2 CHEESE BURGER | 2 POTATO M | 3 CHEESE BURGER |
| 1 HAMBURGER | 1 TEA | 1 COLA |
| 1 COFFEE | 1 HOT TEA | 1 COFFEE |
| 2 COLA | | |
| ** DISAGREE | | |

| #1234 | #1264 | #1265 |
|---|---|---|
| 2 CHEESE BURGER | 2 POTATO M | 3 CHEESE BURGER |
| 1 HAMBURGER | 1 TEA | 1 COLA |
| 1 COFFEE | 1 HOT TEA | 1 COFFEE |
| 2 COLA | | |
| 10g DISAGREE | | |

| #1234 | #1264 | #1265 |
|---|---|---|
| 2 CHEESE BURGER P | 2 POTATO M | 3 CHEESE BURGER |
| 1 HAMBURGER P | 1 TEA | 1 COLA |
| 1 COFFEE | 1 HOT TEA | 1 COFFEE |
| 2 COLA | | |

401

ELECTRONIC CASH REGISTER SYSTEM

BACKGROUND OF THE INVENTION

1. Field of the Invention

This invention relates to an electronic cash register system.

2. Description of the Prior Art

Electronic cash registers for processing orders and accounting are known. Prior art electronic cash registers are disclosed in U.S. Pat. Nos. 5,864,824 and 4,843,547. In such prior arts, an operator (cook) prepares the ordered articles and packages the articles in a paper bag with monitoring a display image indicating the ordered articles. However, the operator may incorrectly prepare or package articles.

SUMMARY OF THE INVENTION

The aim of the present invention is to provide a superior electronic cash register system.

According to the present invention, a first aspect of the present invention provides an electronic cash register system comprising: a keyboard including article keys indicative of articles to be dealt with; article input key start and end detection means responsive to the keyboard for detecting start and end of inputting operations of the article keys for every order; data storing means for storing weight data of the articles, the weight data having correspondence to the article keys, respectively; total weight calculating means for reading the weight data in response to each of article keys and the article key input start and end detection means and for calculating a total of the read weight data; weight measuring means for measuring weight of an object; comparing means for comparing the weight with the total; and informing means for informing an operator of an error when the weight of the object substantially disagrees with the total.

Preferably, the electronic cash register system further comprising: order number generating means for repeatedly generating different order number data in response to the article input key start and end detection means; storing means responsive to the article input key start and end detection means for repeatedly storing the total and the order number data to store a plurality of sets of totals and order number data; order number input means for inputting an order number; detecting means for detecting that one of the sets of which order number data agrees with the inputted order number; and reading means for reading the total of the detected set, wherein the informing means informs the operator of the error when the weight of the object substantially disagrees with the total of the detected set.

Preferably, the data storing means further stores flag data with correspondence with the weight data of the articles, respectively, the flag data indicating whether or not the stored weight data is a target of the total, and the total weight calculating means effects addition of the weight data to calculate the total when the flag data indicates that the weight data is the target.

Preferably, the electronic cash register system further comprises excluding command inputting means for inputting a total calculation excluding command. The total weight calculating means excludes, in calculating the total, the weight data having correspondence to one of the article keys which is operated in relation to operation of the excluding command inputting means.

According to the present invention, a second aspect of the present invention provides an electronic cash register system comprising: a key board including article keys indicative of articles to be dealt with; article input key start and end detection means responsive to the keyboard for detecting start and end of inputting operations of the article keys for every order; data storing means for storing weight data of the articles; total weight calculating means for reading the weight data in response to each of article keys and the article key input start and end detection means and calculating a total of read the weight data; and printing means for printing the total on a sheet.

Preferably, the printing means prints the total on the sheet with bar codes. The electronic cash register system may further comprise: a scale unit including; bar code reading means for reading the bar codes to output bar code data; weight measuring means for measuring an weight of an object; comparing means for comparing the weight with the bar code data from the bar code reading means; and informing means for informing an operator of an error when the weight of the object substantially disagrees with the bar code data from the receiving means.

Preferably, the printing means prints the total with bar codes. The electronic cash register system may further comprise: bar code data reading means for reading the printed bar codes to generate bar code data; a scale unit including; weight measuring means for measuring weight of an object; and transmitting means for transmitting the measure weight; receiving means for receiving the measured weight from the transmitting means; comparing means for comparing the measured weight with the bar code data; and informing means for informing an operator of an error when the measured weight substantially disagrees with the bar code data from the receiving means.

According to the present invention, a third aspect of the present invention provides an electronic cash register system comprising: an electronic cash register including: a key board including article keys indicative of articles to be dealt with; article input key start and end detection means responsive to the keyboard for detecting start and end of inputting operations of the article keys for every order; data storing means for storing weight data of the articles; total weight calculating means for reading the weight data in response to each of article keys and the article key input start and end detection means and for calculating a total of the read weight data; and first transmitting means for transmitting the total; a scale unit including; weight measuring means for measuring an weight of an object; and second transmitting means for transmitting the weight; and a controller including: receiving means for receiving the transmitted total and the transmitted weight; comparing means for comparing the transmitted weight with the transmitted total; and outputting means for outputting a comparing result of the comparing means.

Preferably, the electronic cash register further comprises: order number generating means for repeatedly generating different order number data in response to the article input key start and end detection means; first storing means responsive to the article input key start and end detection means for repeatedly storing a set of the total and the order number data to store a plurality of sets of the totals and the order number data; printing means for repeatedly printing the different order number with bar codes on a sheet in response to the order number generating means, the first transmitting means transmitting a plurality of sets of the totals and the order number data from the first storing means. Moreover, the controller may further comprise: bar code reading means for reading the bar codes on the sheet to output bar code data, the receiving means receiving a plurality of sets of the totals and the order number data from the first transmitting means; and second storing means for storing a plurality of sets of the totals and the order number data from the receiving means; detecting means for detecting that one of the sets of which order number data agrees with the bar code data; and reading means for reading the total of the detected set from the second storing means. The comparing compares the transmitted weight with the total of the detected set.

Preferably, the electronic cash register system may further comprise display means, wherein the outputting means outputs the comparing result and the display means displays an error message in accordance with the comparing result when the transmitted weight substantially disagrees with the transmitted total. In this case, the display means may display the error message on a screen and blink at least a portion of the screen when the transmitted weight substantially disagrees with the transmitted total.

Preferably, the electronic cash register may further comprise: order number generating means for repeatedly generating different order number data in response to the article input key start and end detection means; article data generation means for generating article data in response to the article keys; first storing means responsive to the article input key start and end detection means for repeatedly storing a set of the article data, the total, and the order number data to store a plurality of sets of the article data, the totals, and the order number data, the first transmitting means transmitting a plurality of sets of the article data, the totals, and the order number data from the first storing means; and the receiving means receiving a plurality of sets of the article data, the totals, and the order number data from the first transmitting means. Moreover, the controller may further comprise; second storing means for storing a plurality of sets of the article data, the totals, and the order number data from the receiving means; and display means for displaying a plurality of sets of the article data, the totals, and the order number data from the second storing means. Moreover, the data storing means may further store flag data with correspondence with the weight data respectively, the flag data indicating whether or not the stored weight data is a target of the total. The first storing means further stores the flag data such that in each of the sets, the flag data is stored with correspondence with the article data. The second storing means stores a plurality of sets of the article data, the flag data, the totals, and the order number data from the first storing means which are received by the receiving means. The display means displays a plurality of sets of the article data, the flag data with a predetermined image, and the order number data from the second storing means, whereby the predetermined image indicates that the article indicated by the article data should be packaged.

Preferably, the electronic cash register system may further comprise display means. Moreover, the outputting means may output the comparing result and the display means displays an error message in accordance with the comparing result when the transmitted weight substantially disagrees with the transmitted total. Moreover, the display means may display the error message on a screen and blinks at least a portion of the screen when the transmitted weight substantially disagrees with the transmitted total. Further, the controller may further comprise a subtractor for obtaining a difference between the transmitted weight and the transmitted total and the display means further displays the difference.

BRIEF DESCRIPTION OF THE DRAWINGS

The object and features of the present invention will become more readily apparent from the following detailed description taken in connection with the accompanying drawings in which:

FIG. 3 is an illustration according to the first embodiment showing a data table stored in the setting data memory shown in FIG. 1;

FIG. 4 is a plan view of a keyboard according to the first embodiment;

FIG. 5 depicts a flow chart according to the first embodiment showing operation of the keyboard shown in FIG. 4 by an operator;

FIG. 7 is a table of a second embodiment showing the data in the total memory shown in FIG. 1;

FIG. 8 is an illustration of the second embodiment showing operation of the keyboard shown in FIG. 4;

FIG. 10 is a table of a third embodiment showing the data in the setting data memory shown in FIG. 1;

FIG. 12B depicts a flow chart of the electronic cash register according to the fourth embodiment;

FIG. 20 is a block diagram of an electronic cash register system according to an eighth embodiment;

FIG. 21 is an illustration of the keyboard according to the eighth embodiment;

FIGS. 24A and 24B depict flow charts of the eighth embodiment showing operation of the controller of the eighth embodiment;

FIG. 25 is a block diagram of the electronic cash register system according to a ninth embodiment;

FIG. 26 is an illustration of the ninth embodiment showing data printed on a receipt;

FIG. 29 is a block diagram of the electronic cash register system according to a tenth embodiment;

FIG. 30 is an illustration of keys on the controller keyboard according to the tenth embodiment;

FIG. 31 is an illustration of the tenth embodiment showing the displayed image on the monitor display shown in FIG. 29;

FIG. 36 is an illustration of a twelfth embodiment showing the displayed image on the monitor display;

FIG. 38 is an illustration of a thirteenth embodiment showing the displayed image on the monitor display;

FIG. 40 is an illustration of a fourteenth embodiment showing the displayed image on the monitor display;

The same or corresponding elements or parts are designated with like references throughout the drawings.

DETAILED DESCRIPTION OF THE INVENTION

First Embodiment

Figure 1:
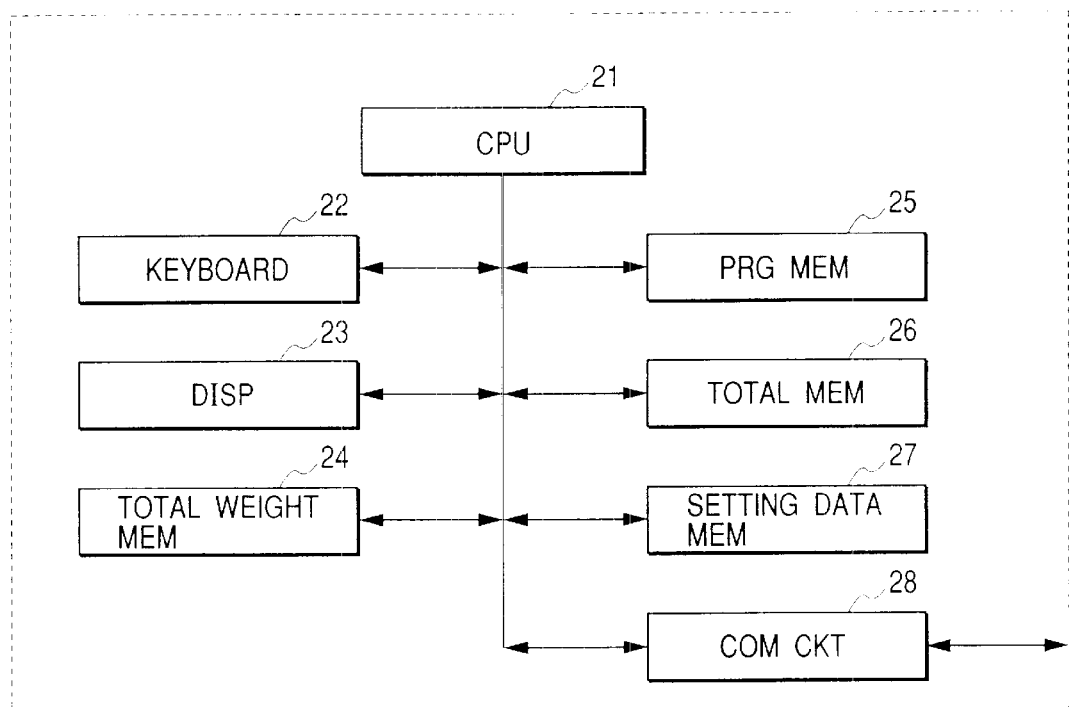
FIG. 1 is a block diagram of an electronic cash register according to a first embodiment.
Figure 2:
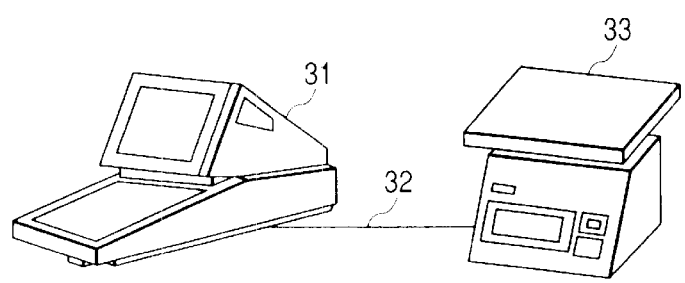
FIG. 2 is a block diagram of an electronic cash register system according to the first embodiment.

FIG. 1 is a block diagram of an electronic cash register according to a first embodiment. FIG. 2 is a block diagram of an electronic cash register system according to the first embodiment.

In FIG. 2, the electronic cash register system includes the electronic cash register 31, a balance 33, and a communication cable 32. The balance 33 is coupled to the electronic cash register 31 with the communication cable 32.

The electronic cash register 31 includes a program memory 25 for storing programs for operating the electronic cash register 31, a cpu (central processing unit) 21 for effecting controlling such as calculation and output controlling in accordance with the programs in the program memory 25, a keyboard 22 for key-inputting, a total memory 26 for storing totals (bills) and the number of ordered articles, a setting data memory 27 for storing names of article, unit prices, weight data, e.t.c., a total weight memory 24 for storing a total of weight of ordered articles, a display 23 for displaying data of the article name, unit price, weight data, e.t.c., a communication circuit 28 for communicating with the balance 33.

FIG. 3 is an illustration according to the first embodiment showing a data table stored in the setting data memory 27. The data table shown in FIG. 3 includes an article name column 11, a unit price column 12, and a weight column 13. That is, a unit price and weight data are stored every article name data with correspondence. For example, a unit price of 200 yen, and a weight of 100 g are stored for a hamburger.

FIG. 4 is a plan view of the keyboard 22 according to the first embodiment.

The keyboard 22 includes article keys 41 representing articles to be sold, numeral keys 42 for inputting numerical data, a subtotal key 43 for obtaining a subtotal, a measuring key 44 for effecting measurement by the balance 33 and obtaining the measured weight, a take-in key 45 representing taking the articles in the shop, and a take-out key 46 representing taking the articles outside the shop.

FIG. 5 depicts a flow chart of operating the keyboard 22 by an operator according to the first embodiment.

It is assumed that the operator receives an order of hamburger, a cheese-burger, a middle size of potato fry (potato fry M), and a cola. The operator successively depresses a hamburger key 41 (100 g), a cheese-burger key 41 (115 g), an M potato fry key 41 (120 g), and a cola key 41. In response to depression of each article key 41, weight data corresponding to the depressed article key 41 is read and summed as a total in the total weight memory 24 In response to depression of the subtotal key 43, the actual total of the weight data is established. That is, a weight of 455 g is calculated. The cpu 21 calculates and displays the subtotal of the ordered articles on the display 23. Then, the operator reports the subtotal and inquires whether the customer takes in or takes out the ordered articles. If the customer requests to take out the articles, the operator depresses the take-out key 46 to process the payment.

Next the operator packages the article in a paper bag, etc., with watching the display or the receipt indicating the names and the number of articles and puts the bag on the balance 33. The operator depresses the measuring key 44.

In response to the measuring key 44, the cpu 21 communicates with the balance 33 through the communication circuit 28 and the communication cable 32 to measure the weight of the paper bag. The balance 33 measures the weight of the paper bag and transmits the measured weight to the cpu 21. The cpu 21 compares the measured weight with the total of the weight in the total weight memory 24. If the measured weight substantially disagrees with the total of the weight in the total weight memory 24, the cpu 21 displays an error on the display 23. This means that the operator erroneously prepares or puts the articles in the paper bag. In response to the error message, the operator checks the articles in the paper bag and prepares or puts correct articles in the paper bag again. Then, the operator depresses the measuring key 44 again. If the measured weight substantially agrees with the total of the weight in the total memory 26, processing ends.

Figure 6:
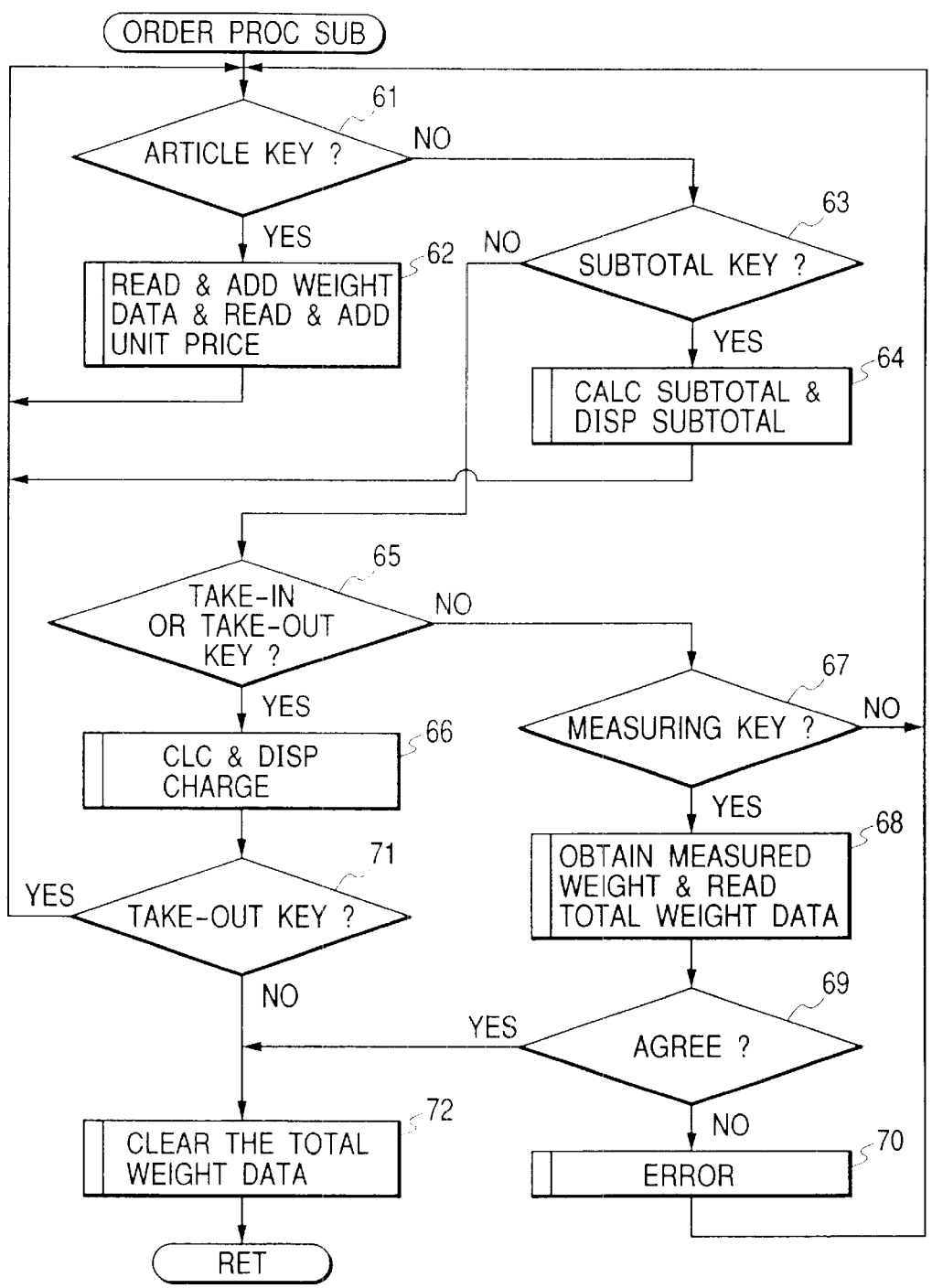
FIG. 6 depicts a flow chart showing operation of the electronic cash register according to the first embodiment.

FIG. 6 depicts a flow chart of the electronic cash register according to the first embodiment.

The cpu 21 executes this operation (interruption) in response to power on and end of processing the previous order.

In step 61, the cpu 21 checks whether the key input is derived from the depression of any article key 41. If the key input is derived from the depression of any article key 41, processing proceeds to step 62. In step 62, the cpu 21 reads the weight data corresponding to the depressed article key 41 from the setting data memory 27 and adds the read weight data to the previous total value. At first, the total value is zero. The cpu 21 stores the total value in the total weight memory 24 and processing returns to step 61. In step 61, if the key input is derived from the depression of a key other than article keys 41, processing proceeds to step 63. In step 63, the cpu 21 checks whether the key input is derived from the depression of the subtotal key 43. If the key input is derived from the depression of the subtotal 41, processing proceeds to step 64. In step 64, the cpu 21 calculates the subtotal and displays the subtotal on the display 23 and processing returns to step 61.

In step 63, if the key input is not derived from the depression of the subtotal key 43, processing proceeds to step 65. In step 65, the cpu 21 checks whether the key input is derived from the depression of the take-in key 45 or the take-out key 46. If the key input is derived from the depression of the take-in key 45 or the take-out key 46, processing proceeds to step 66. In step 66, the cpu 21 calculates and displays the change. Next, in step 71, the cpu 21 checks whether the key input is derived from the depression of the take-out key 46. If the key input is derived from the depression of the take-out key 46, processing proceeds to step 72. In step 72, the cpu 21 clears the total weight data in the total weight memory 24 and processing returns to a main routine (not shown) where the data is recorded and processing enters this subroutine again to wait the next order.

In step 65, if the key input is not derived from the depression of the take-in key 45 or the take-out key 46, processing proceeds to step 67. In step 67, the cpu 21 checks whether the key input is derived from the depression of the measuring key 44. If the key input is not derived from the depression of the measuring key 44, processing returns to step 61. In step 67, if the key input is derived from the depression of the measuring key 44, processing proceeds to step 68. In step 68, the cpu 21 obtains the measured weight from the balance 33. In step 69, the cpu 21 checks whether the measured weight substantially agrees with the total weight data. If the measured weight substantially agrees with the total weight data, processing proceeds to step 72 where the cpu 21 clears the total weight data and processing returns to the main routine.

In step 69, if the measured weight substantially disagrees with the total weight data, processing proceeds to step 70 where the cpu 21 displays "error" on the display 23 and processing returns to the step 61.

Name data, a unit price, weight data of each article are inputted with the keyboard 22 in a setting mode. For example, the electronic cash register 31 enters in response to depressing predetermined two keys at the same time.

In FIG. 6, start and end of inputting key operation of article keys 41 for every order is detected in response to the subtotal key 43 in step 63. However, it is also possible to detect start and end of key inputting of article keys 41 in response to a take-in key 45, the take-out key 46, or the measuring key 46. More specifically, the subtotal key 43 detects the end of inputting article keys 41 for this order in step 63 and the take-in key 45 detects the start of the inputting operation for the next order. Agreement in step 69 also indicates the key input of the next order. Moreover, there are various ways for detecting start and end of inputting article keys 41. For example, the operator shuts the drawer (not shown) for containing money of the electronic cash register, when the operator has finished the processing the order. Shutting the drawer may indicate the start of the key input of article keys for the next order.

According to the kinds of articles, substantial agreement will varies. That is, if the articles are fast foods, substantial agreement can be Judged when the difference between the total weight and the measured weight is within 5 g. However, this value can be set in the setting data memory 27.

As mentioned above, in this electronic cash register, total weight is calculated every order in response to depression of article keys. The calculated total weight data is compared with the measured weight of the package containing the ordered articles. If the calculated total weight data substantially disagrees with the measured weight, it is Judged that the operator erroneously packs the article. Therefore, "error" is displayed on the display 23. Accordingly, the probability of erroneously preparing the article can be decreased, so that this prevents to provide unpleasant feeling to the customer.

Second Embodiment

The electronic cash register according to a second embodiment has substantially the same structure as that of the first embodiment. The difference is that the total weight data of an order is stored in the total weight memory 24 every order number of the order.

FIG. 7 is a table of a second embodiment showing the data in the total weight memory 24.

In FIG. 7, each calculated total weight data is stored in the total weight memory 24 with relation to each order number 73.

The operator inputs an order number for the present order before the operator operates article keys 41 to receive each order. The order number 73 is stored in the total weight memory 24 and the calculated total weight data 74 is also stored with relation to each order number 73.

FIG. 8 is an illustration of the second embodiment showing operation of the keyboard 22 for weight comparing operation.

The operator inputs the order number by successively depressing numeral keys 42 of "1", "2", "6", and "1". Next the operator depresses the measuring key 44.

In response to this, the cpu 21 reads the total weight data having relation with (corresponding to) the inputted order number from the total weight memory 24. Next, the cpu 21 compares the calculated total weight data 74 of the order number is compared with the measured total weight from the balance 33.

Figure 9:
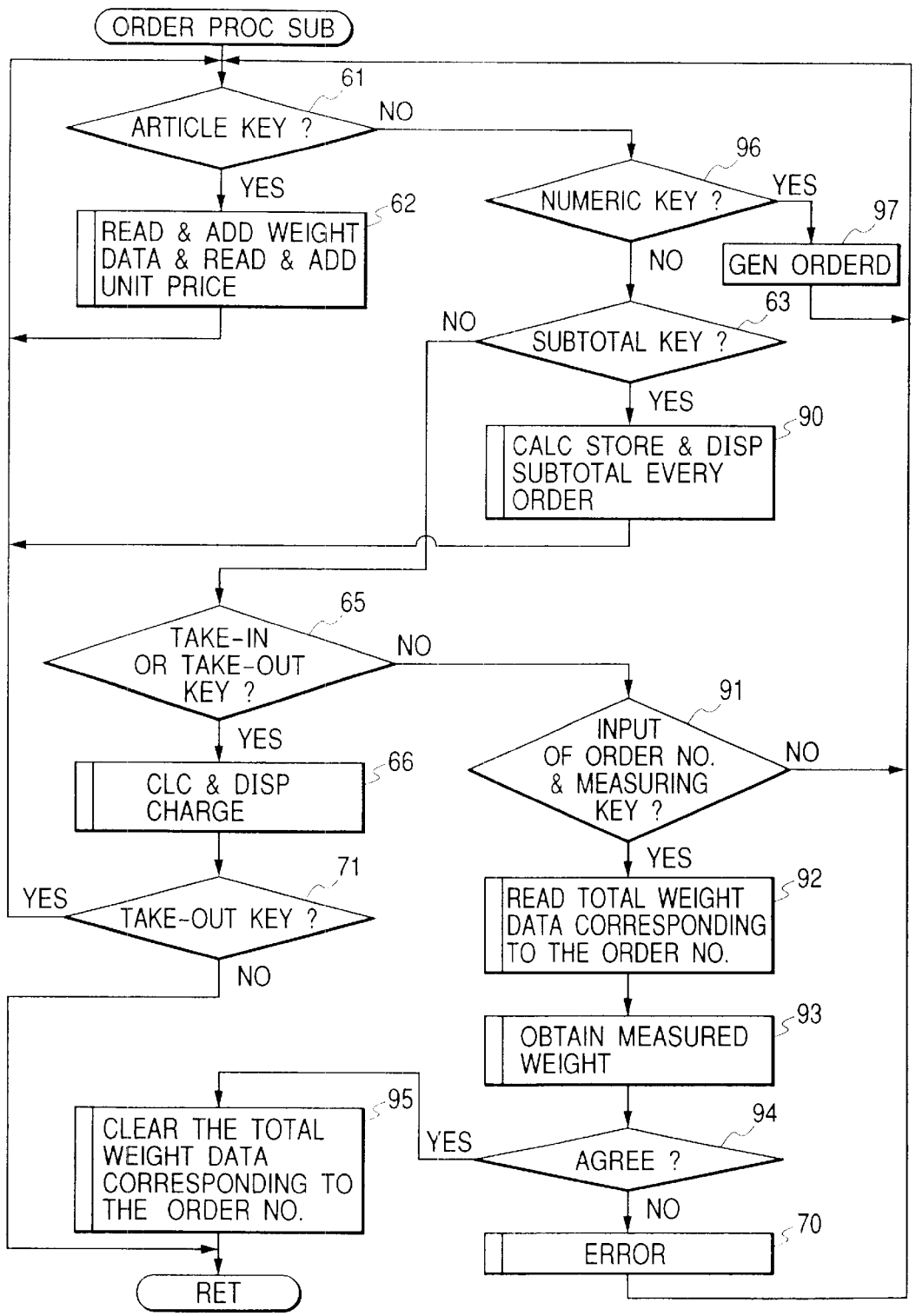
FIG. 9 depicts a flow chart of the electronic cash register according to the second embodiment.

FIG. 9 depicts a flow chart of the second embodiment.

The operation represented in FIG. 9 is partially the same as that shown in FIG. 6. The difference is as follows:

When the answer in step 61 is YES, the cpu 21 checks whether the depresses key is a numeric key. If the depressed key is a numeric key the cpu 21 generates an order number data in step 97.

More over, if the answer is NO in step 65, the cpu 21 checks whether order number has been inputted and measuring key 44 is depressed in step 91. If the answer is NO in step 91, processing returns to step s61. If the answer is YES, the cpu 21 reads the total weight data corresponding to the inputted order number in step 92. In the following step 93 the cpu 21 obtains the measured weight from the balance 33. In step 94, the cpu 21 checks whether the measured weight substantially agrees with the total weight data of the order number. If the measured weight substantially agrees with the total weight data, processing proceeds to step 95 where the cpu 21 clears the total weight data and processing returns to the main routine.

In step 94, if the measured weight substantially disagrees with the total weight data, processing proceeds to step 70 where the cpu 21 displays "error" on the display 23 and processing returns to the step 61.

Moreover, in step 90 after step 63, the cpu 21 calculates, stores, and displays the subtotal every order number.

In the first embodiment, the total weight data is erased every processing the order. Thus, comparing the total weight data with the measured weight should be done every processing order. In other words, receiving the next order cannot be done if the comparing has not finished. On the other hand, in the second embodiment, the total weight data is read and compared with the measured weight every inputted order number. Thus, it is possible to successively receive orders irrespective of measurement and comparison.

In the above-mentioned embodiment, the order number is inputted before receiving every order. However, it is also possible to generate the order number data before inputting the ordered articles or to generate the order number data of the next order after receiving the previous order. Moreover, the different order number data may be generated automatically.

Third Embodiment

The electronic cash register according to a third embodiment has substantially the same structure as that of the first embodiment. The difference is that an addition flag is stored in the setting data memory 27 every article.

FIG. 10 is a table of a third embodiment showing the data in the setting data memory 27.

The addition flag indicates that the weight data correspondingly stored with the article name 11 is to be added to provide the total weight. That is, the weight data correspondingly stored with the addition flag is a target of the total in calculation of the total weight. The addition flag having a value of "1" indicates that the corresponding weight data is added to provide the total weight. In other words, the article should be packaged in a paper bag with other articles. On the other hand, the addition flag having a value of "0" indicates the weight data correspondingly stored with the article name 11 is not to be added to provide the total weight. In other words, the article should not be packaged with other articles.

In FIG. 10, each addition flag is correspondingly stored with each article name 11 and a unit price 12, and weight data 13.

If the additional flag is "1", the cpu 21 adds the weight of the article in response to the depressed article key 41 to the previous total value. If the additional flag is "0", the cpu 21 does not add the weight of the article in response to the depressed article key 41 to the previous total value.

Figure 11:
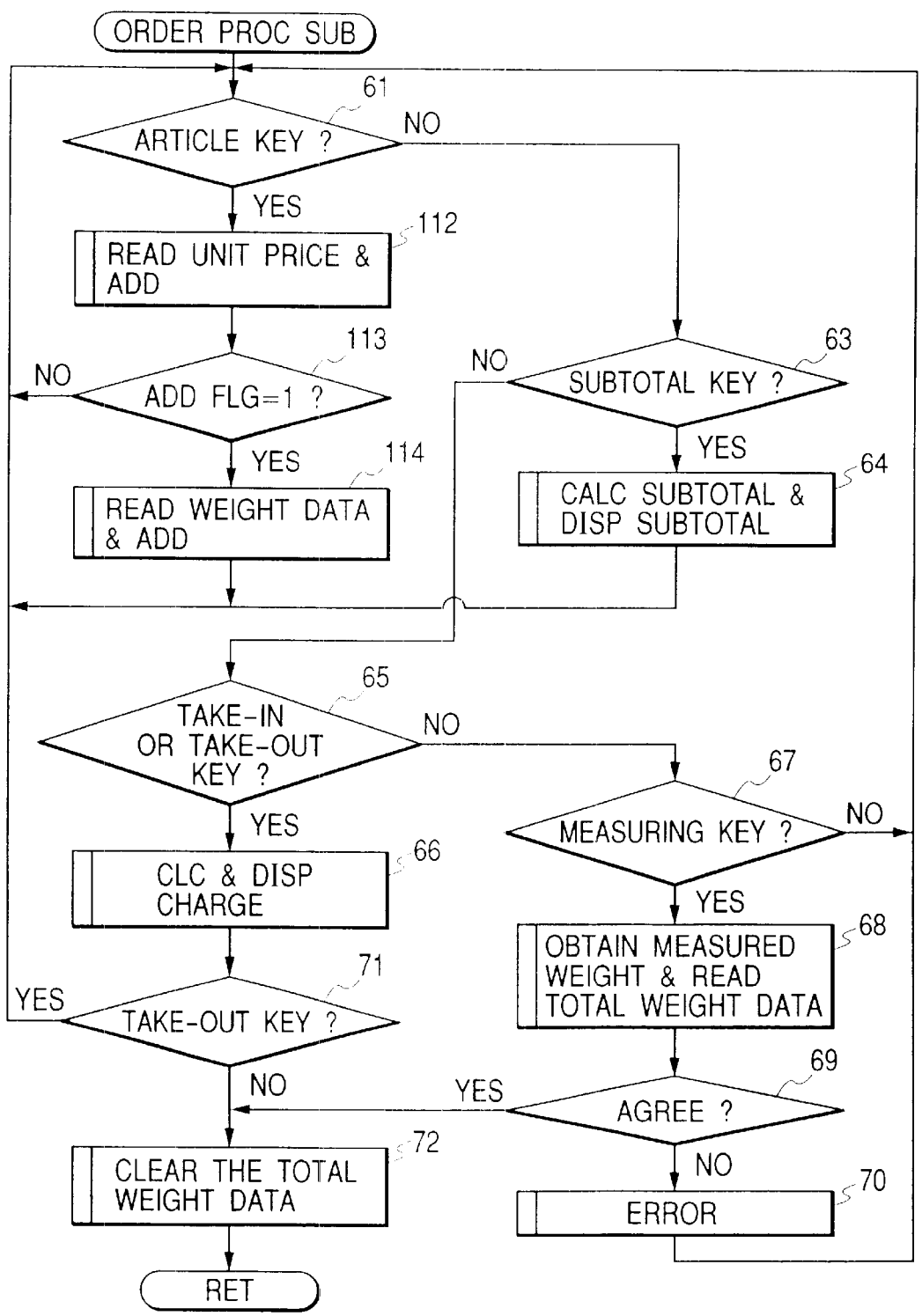
FIG. 11 depicts a flow chart of the electronic cash register according to the third embodiment.

FIG. 11 depicts a flow chart of the third embodiment.

The operation represented in FIG. 11 is partially the same as that shown in FIG. 6. The difference is as follows:

If the answer in step 61 is YES, the cpu 21 reads the unit price correspondingly stored with the article indicated by the depressed article key 41 and adds the read unit price to the previous total value in step 112. In the following step 113, the cpu 21 checks whether the addition flag 104 correspondingly stored with the article indicated by the depressed article key 41 is "1" or "0". If the addition flag 104 is "1", the cpu 21 reads the weight data 13 correspondingly stored with the article indicated by the depressed article key 41 and adds the read weight data to the previous total weight value in step 114. If the addition flag 104 is "0", processing returns to step 61. That is, the cpu 21 does not add the weight data to the previous total weight value. Thus, the total weight compared with the measured weight in step 69 is calculated only the weight data of the article of which addition data is "1".

As mentioned above, in this embodiment, if the weight of an article may change or an article which is not to be packaged in a paper bag, the weight is not added to provide the total weight. The operator measures the weight of the paper bag or a set of articles except those articles.

Thus, accurate comparison is provided.

Fourth Embodiment

The electronic cash register according to a fourth embodiment has substantially the same structure as that of the third embodiment. The difference is that a non-addition key 421 is further provided on the keyboard 22 and the addition flag (total calculation excluding command) is set in the setting data memory 27 in response to the non-addition key 421.

Figures 12A, 13A:
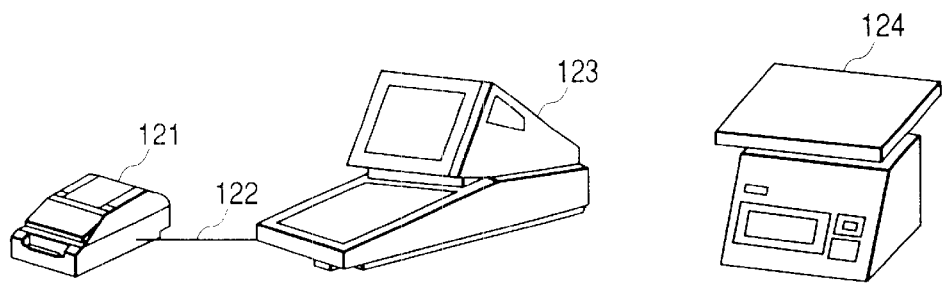
FIG. 12A is a plan view of the keyboard according to the fourth embodiment.
FIG. 13A is a block diagram of an electronic cash register system according to a fifth embodiment.

FIG. 12A is a plan view of the keyboard 22 according to the fourth embodiment.

If the operator does not desire that the total weight includes a specific article, the operator depresses the non-addition key 421 Just before depressing a desired article key 41. For example, in the case of cola, the weight will varies in accordance with whether ice is inputted in cola in a glass from the setting weight. In that case, to exclude the article from measuring target, the operator depresses the non-addition key 421 before depressing the article key 41. Then, the article is excluded from the target of measurement. The operator does not input the article in the paper bag to be measured.

FIG. 12B depicts a flow chart of the fourth embodiment.

The operation represented in FIG. 12B is partially the same as that shown in FIG. 11. The difference is that steps 431 and 432 are added and the step 433 replaces the step 113.

In step 431, the cpu 21 Judges whether the non-addition key 421 is depressed. If the non-addition key 421 is depressed, the cpu 21 sets a non-addition flag in step 432. After this, if an article key 41 is depressed in step 61, the processing bypasses the step 434. That is, the weight data corresponding to the depressed article key 41 is not added to the previous total value. More specifically, in step 433, if the non-addition flag has been set, processing directly returns to step 61. If the non-addition flag has not been set, processing proceeds to step 434. In step 434, the cpu 21 reads the weight data 13 correspondingly stored with the article indicated by the depressed article key 41, adds the read weight data to the previous total weight value, and resets the non-addition flag in step 434.

As mentioned, in this embodiment, the non-addition key 421 is further provided. Thus, when there is the ordered article not to be measured, the article is not packaged in a paper bag and the weight of the paper bag is measured except the article, so that accurate weight comparison is provided.

In the above mentioned embodiment, to exclude the article from the measuring target, the operator depresses the non-addition key 421 before depressing the article key 41. However, it is also possible to depress the non-addition key 421 Just after depressing the article key 41.

Fifth Embodiment

FIG. 13A is a block diagram of an electronic cash register according to a fifth embodiment.

The electronic cash register according to a fifth embodiment has substantially the same structure as that of the first embodiment. The difference is that a printer 121 is further provided. The printer 121 is coupled to the electronic cash register 123. On the other hand, the balance 124 is not coupled to the electronic cash register 123.

In this system, the total weight is printed on a sheet, for example, a receipt. The operator compares the printed total weight with the weight measured by the balance 124. If there is substantially no difference between the printed total weight and the measured weight, the operator Judges that the ordered articles are correctly prepared (take-in) or packaged (take-out).

Figure 13B:
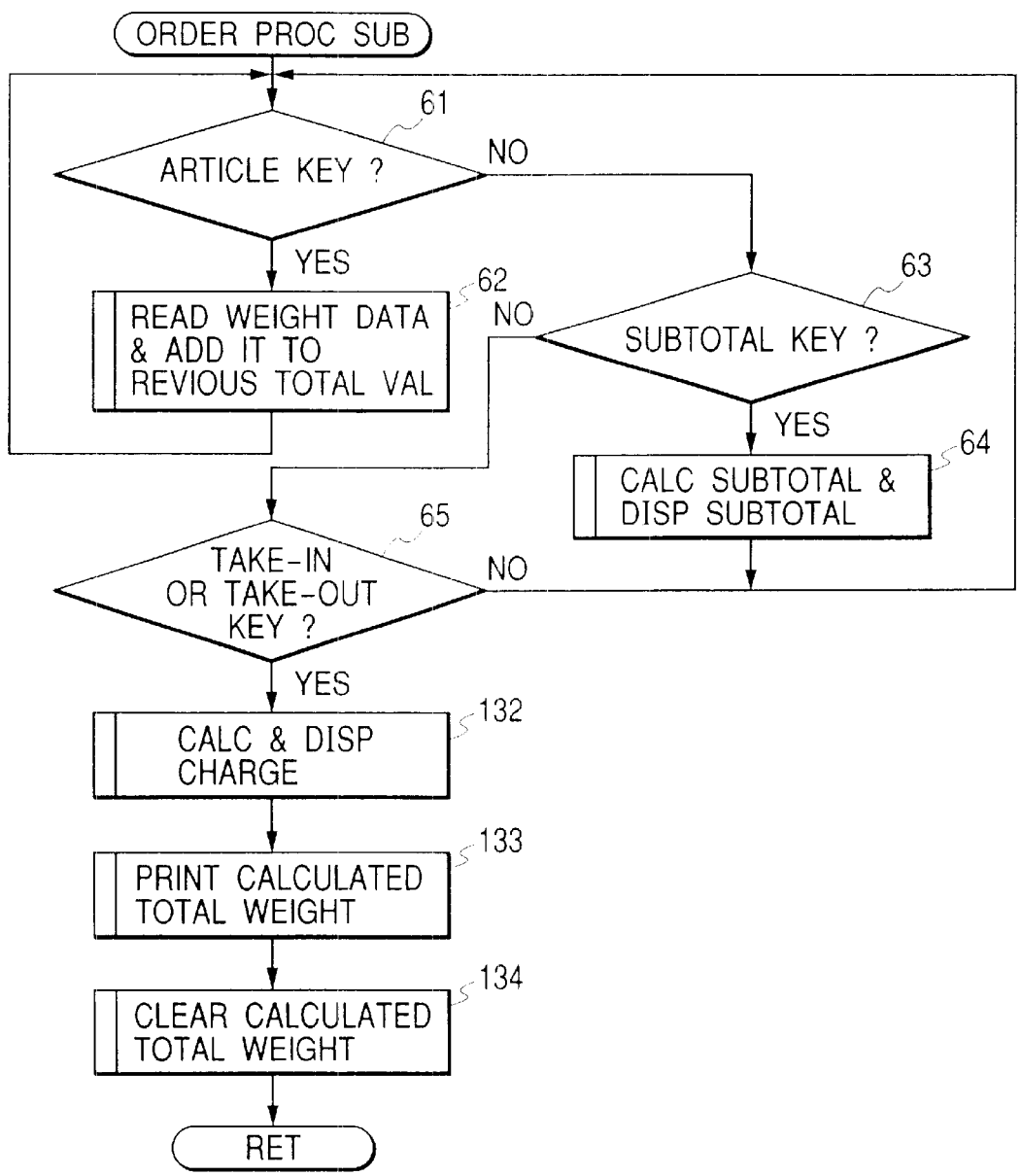
FIG. 13B depicts a flow chart of the electronic cash register according to the fifth embodiment.

FIG. 13B depicts a flow chart of the fifth embodiment.

The operation represented in FIG. 13B is partially the same as that shown in FIG. 6. The difference is that steps 132 to 134 are provided instead steps 66 to 72.

In step 65, the cpu 21 checks whether the key input is derived from the depression of the take-in key 45 or the take-out key 46. If the key input is derived from the depression of the take-in key 45 or the take-out key 46, processing proceeds to step 132. In step 132, the cpu 21 calculates and displays the change. Next, in step 133, the cpu 21 prints the calculate total weight on a sheet with the printer 121. In the following step 134, the cpu 21 clears the total weight data in the total weight memory 24 and processing returns to the main routine (not shown).

In step 65, if the key input is not derived from the depression of the take-in key 45 or the take-out key 46, processing returns to step 61.

Figures 14, 15:
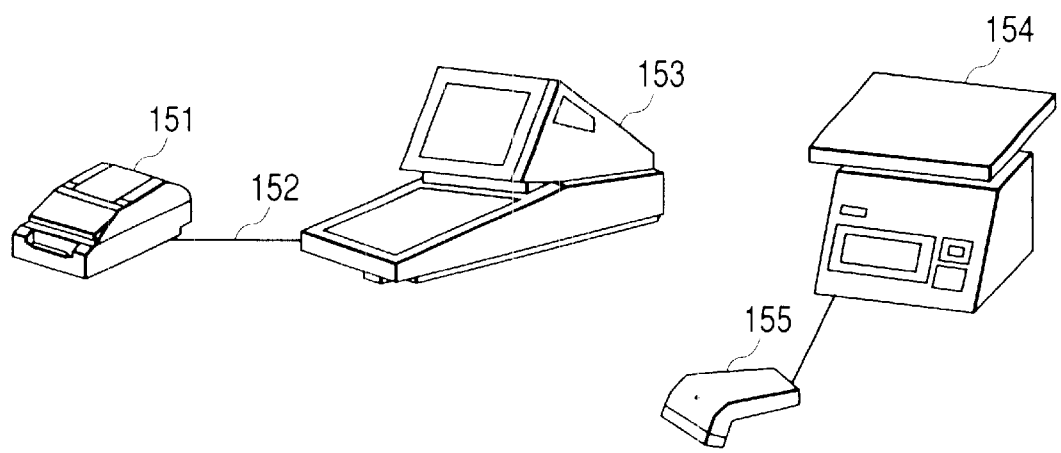
FIG. 14 is an illustration of the fifth embodiment showing the sheet printed by a printer shown in FIG. 13A.
FIG. 15 is a block diagram of the electronic cash register according to a sixth embodiment.

FIG. 14 is an illustration of the sixth embodiment showing the sheet printed by the printer 121. On the sheet (receipt), the calculated weight (455 g) is printed in addition to ordered article names and the number, a subtotal, tax, a total amount, deposit, and change.

If the printed total weight substantially disagrees with the measured weight, the operator checks the articles.

As mentioned above, in this system, comparison is effected by the operation between the printed total weight and the measured weight. Thus, the operating the keyboard 22 of the electronic cash register of the embodiment is similar to that in the conventional electronic cash register. That is, there is no obstacle in the operating the electronic cash register by the operator. Thus, a smooth operation is provided.

Sixth Embodiment

FIG. 15 is a block diagram of the electronic cash register system according to a sixth embodiment.

The electronic cash register according to the sixth embodiment has substantially the same structure as that of the fifth embodiment. The difference is that a bar code reader 155 coupled to the balance 154 is further provided and a printer 151 prints the total weight on a receipt with bar codes. The total weight data represented by bar codes is read by the bar code reader 155 and transmitted to the balance 154. The balance 154 compares the total weight data with the measured weight. If the total weight data substantially disagrees with the measured weight, the balance 154 informs the operator of the error.

Figure 16:
FIG. 16 is an illustration of the sixth embodiment showing data printed on a receipt.

FIG. 16 is an illustration of the sixth embodiment showing data printed on a receipt.

Figure 17A:
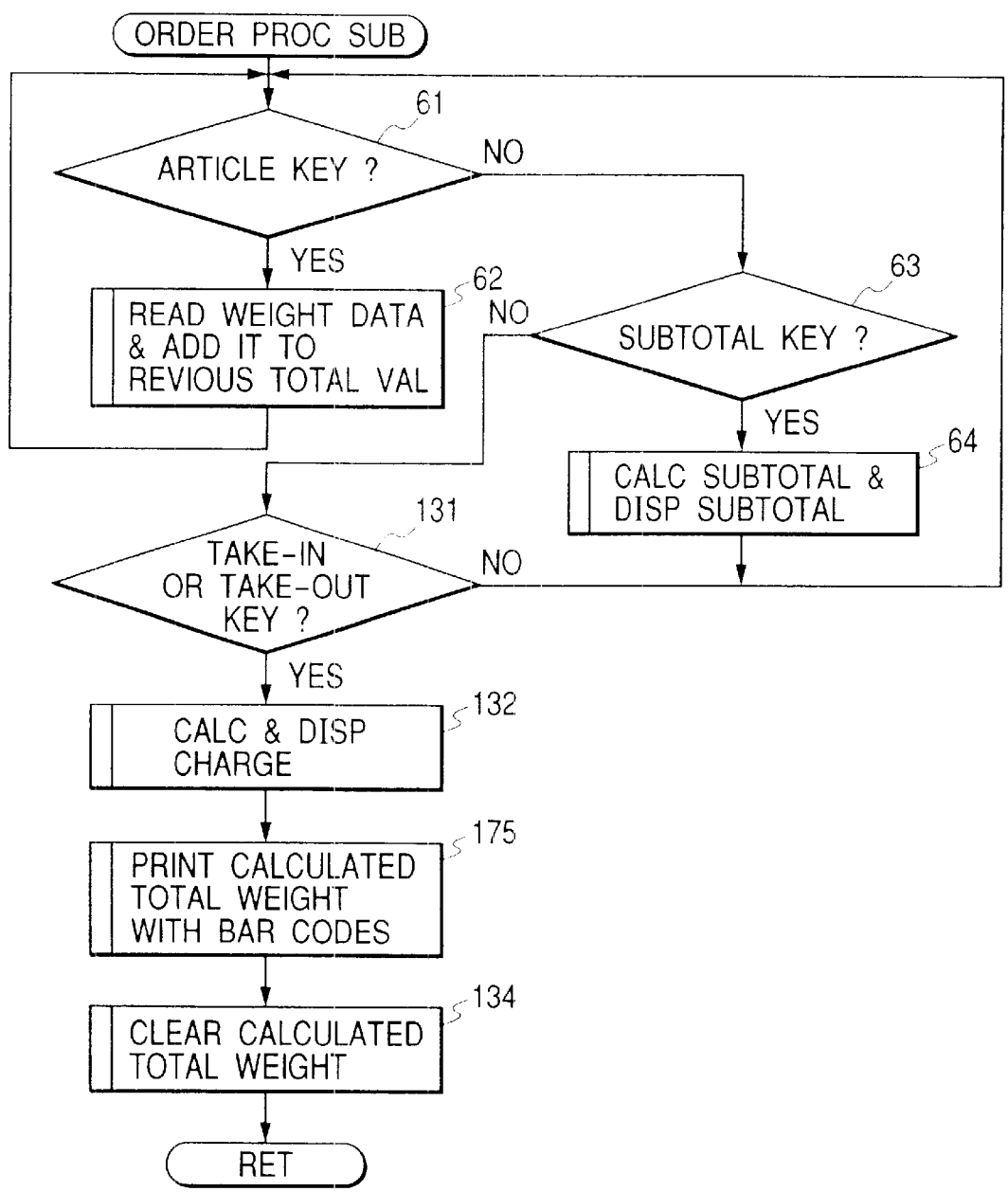
FIG. 17A depicts a flow chart of the electronic cash register according to the sixth embodiment.

FIG. 17A depicts a flow chart of the sixth embodiment.

The operation of the electronic cash register represented in FIG. 17A is partially the same as that shown in FIG. 13B. The difference is that in step 175 instead step 133, the cpu 21 prints the calculated total weight on a receipt with bar codes as shown in FIG. 16.

Figure 17B:
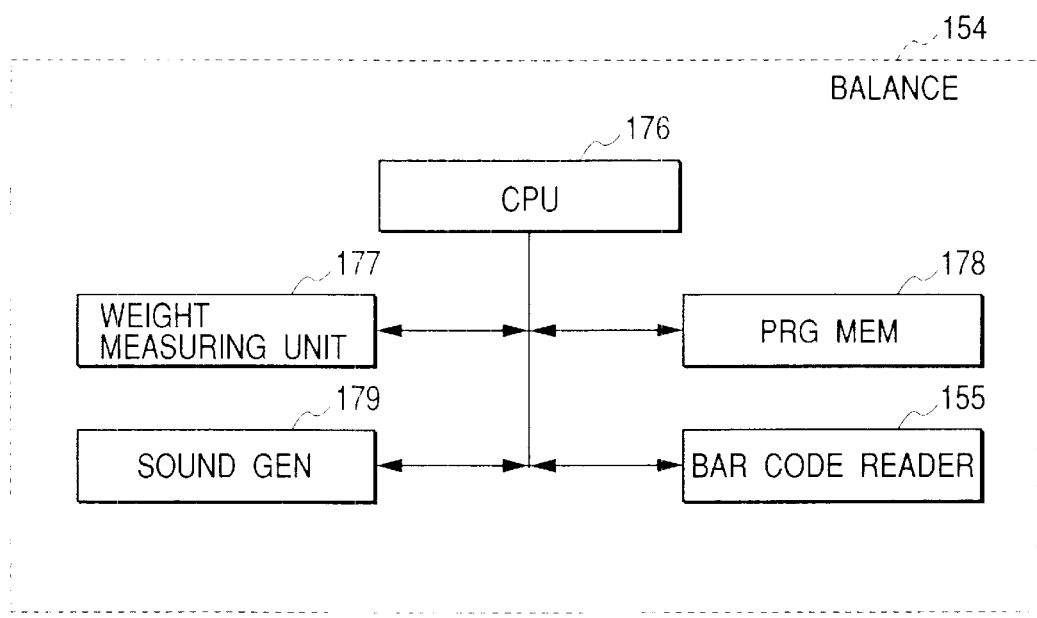
FIG. 17B is a block diagram of the balance according to the sixth embodiment.

FIG. 17B is a block diagram of the balance 154 according to the sixth embodiment. The balance 154 includes a program memory 178 for storing programs of operating the balance 154, a cpu 176 for effecting controlling such as comparing the weight data from the bar code reader 155 with the measured weight in accordance with the programs in the program memory 178, a weight measuring unit 177 for measuring weight to be measured, the bar code reader 155 for reading the bar codes representing the calculated weight, and a sound generator 179 for generating sound representing an error.

Figure 17C:
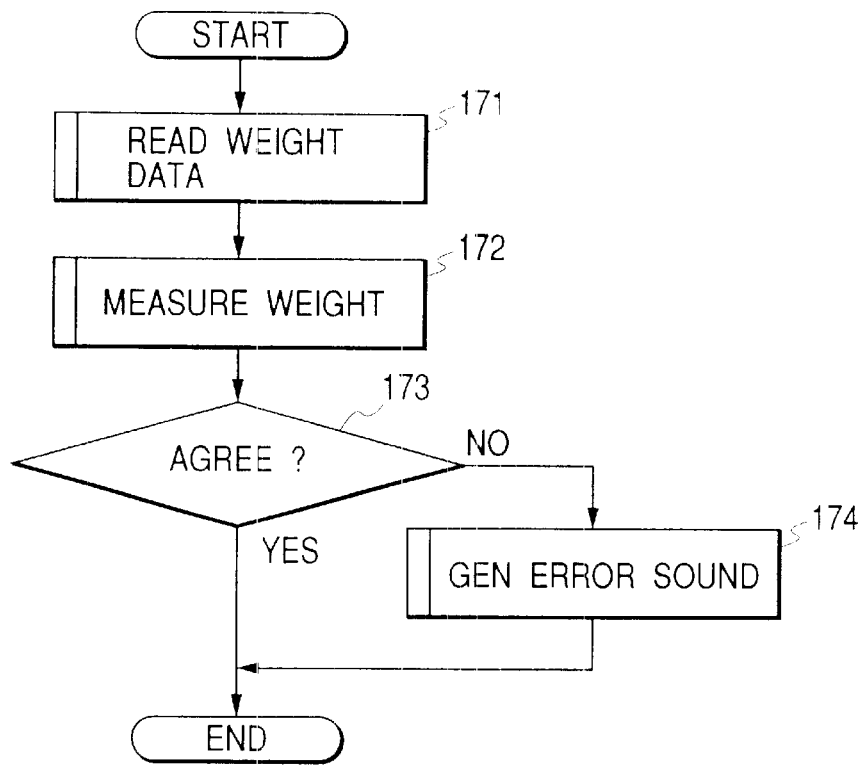
FIG. 17C depicts a flow chart of the sixth embodiment showing operation of the balance shown in FIG. 15.

FIG. 17C depicts a flow chart of the sixth embodiment showing the operation of the balance 154.

In response to start of operation of the bar code reader 155, the balance 154 reads the total weight data with the bar code reader 155 in step 171. In the following step 172, the cpu 176 operates the weight measuring unit 177 to measure the weight of the paper bag or prepared articles on the plate of the balance 15. In the following step 173, the cpu 176 compares the measured weight with the weight data from the bar code reader 155. If the measured weight substantially agrees with the weight data from the bar code reader 155, processing ends. If the measured weight substantially disagrees with the weight data from the bar code reader 155, the cpu 176 operates the sound generator 179 to generate an error sound informing the operator of the error.

The operator, that is, a person preparing the ordered articles, packages the prepared articles in a paper bag with watching the receipt or the screen of the display 23. When the operator has finished packaging, the operator puts the bag on the plate of the balance 154 and operates the bar code reader 155 to read the total weight data printed on the receipt with bar codes. The balance 154 compares the measured weight with the read total weight data. If the measured weight substantially agrees with the read total weight data, it is Judged that the packaging the articles is correct. Thus, the sound informing the operator of an error is not generate. Accordingly, the operator gives the customer the bag. If the sound is generated, the operator checks the articles in the bag and puts correct articles in the bag and measure the weight again. Then, if the sound is not generate, the operator gives the customer the paper bag.

As mentioned, in this system, the weight data is inputted to the balance 154 with the bar code reader 155, so that the operation is easy.

Seventh Embodiment

Figure 18:
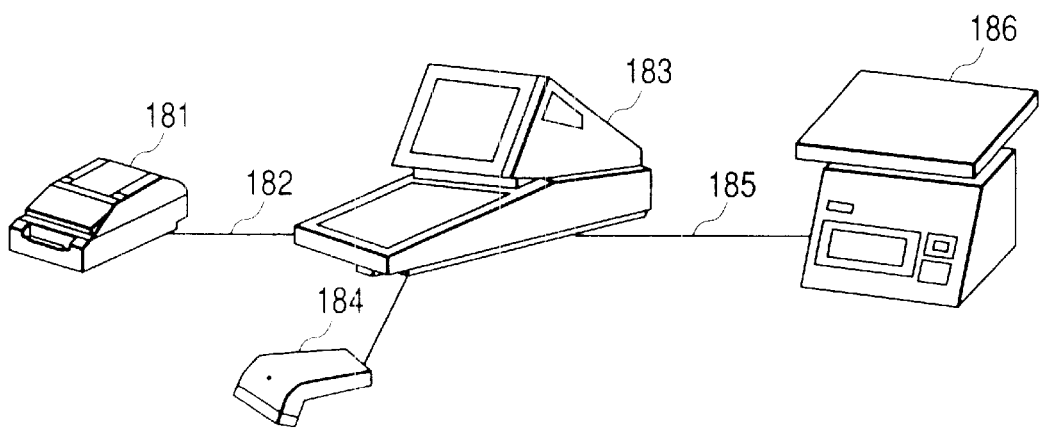
FIG. 18 is a block diagram of the electronic cash register system according to a seventh embodiment.

FIG. 18 is a block diagram of the electronic cash register system according to a seventh embodiment.

The electronic cash register according to the seventh embodiment has substantially the same structure as that of the sixth embodiment. The difference is that the bar code reader 184 is coupled to electronic cash register 183 and the balance 186 is coupled with the electronic cash register 183 through a communication cable 185.

The electronic cash register 183 calculates the total weight and prints the calculated total weight on a receipt. The measured weight of a paper bag is transmitted to the electronic cash register 183 from the balance 186. The electronic cash register 183 reads the total weight data represented by bar codes and compares the measured weight with the weight data from the bar code reader 184.

Figure 19:
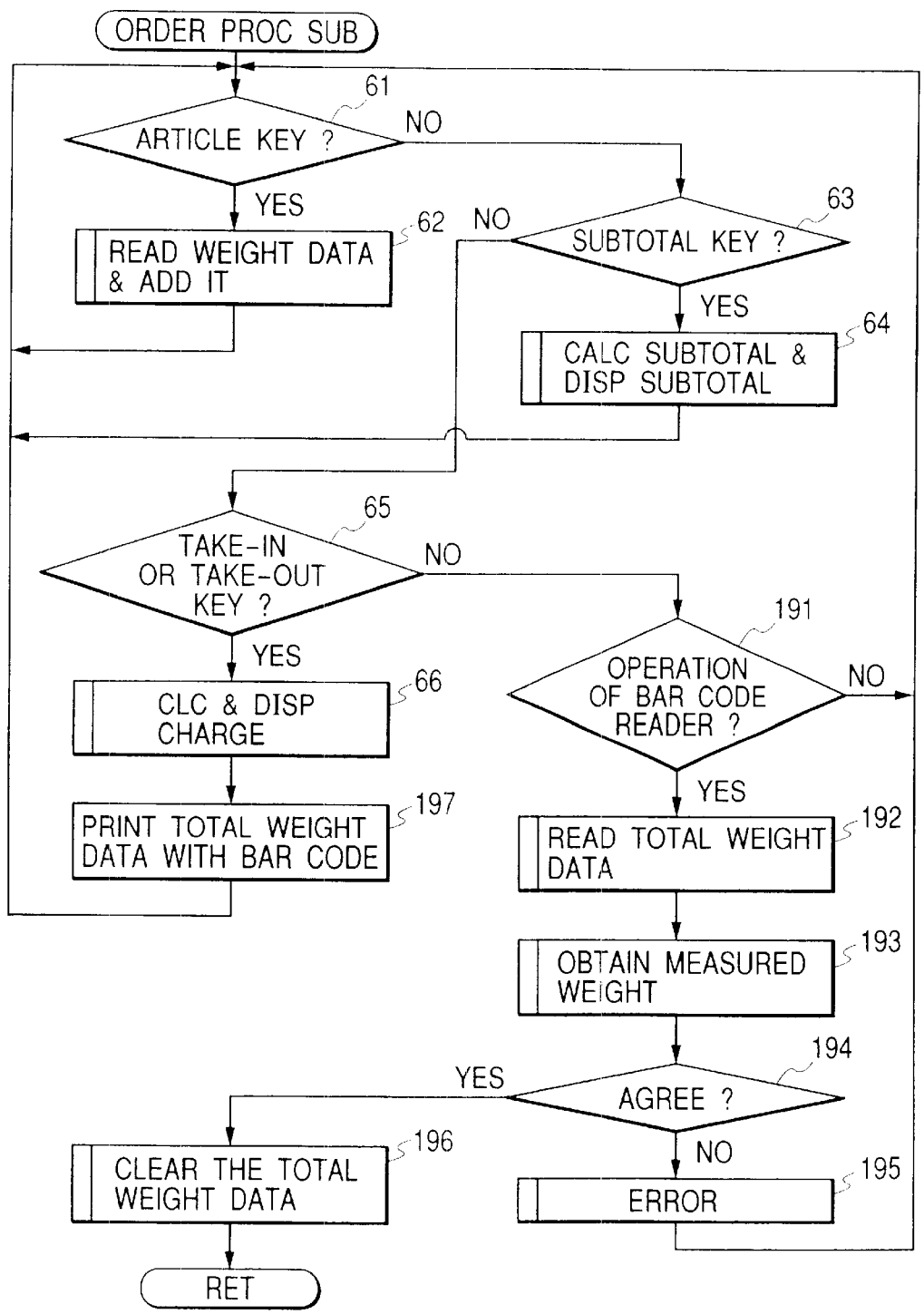
FIG. 19 depicts a flow chart of the electronic cash register according to the seventh embodiment.

FIG. 19 depicts a flow chart of the seventh embodiment.

The operation represented in FIG. 19 is partially the same as that shown in FIG. 6. The difference is as follows:

After step 66, the cpu 21 prints the total weight data on a receipt with bar codes using the printer 181 in step 197 and processing returns to step 61. Moreover, in step 65, if the answer is NO, the cpu 21 checks whether the bar code reader 184 is operated or the bar code reader 184 reads predetermined format of bar codes in step 191. If the bar code reader 184 is operated or the bar code reader 184 reads the predetermined format of bar codes, the electronic cash register 183 reads the total weight data represented with bar codes in step 192.

In the following step 193, the cpu 21 obtains the measured weight from the balance 186. In step 194, the cpu 21 checks whether the measured weight substantially agrees with the total weight data. If the measured weight substantially agrees with the total weight data, processing proceeds to step 196 where the cpu 21 clears the total weight data and processing returns to the main routine.

In step 194, if the measured weight substantially disagrees with the total weight data, processing proceeds to step 195 where the cpu 21 displays "error" on the display 23 and processing returns to the step 61.

In this embodiment, it is not necessary to couple the bar code reader 184 to the balance 186, so that it is not necessary to provide an interface for the bar code reader 184 in the balance 186.

Eighth Embodiment

FIG. 20 is a block diagram of the electronic cash register system according to an eighth embodiment.

The electronic cash register according to the eighth embodiment has substantially the same structure as that of the seventh embodiment. The difference is that the bar code reader is not provided to electronic cash register 201 and a plurality of electronic cash registers 201 are provided and coupled with the communication cable 202. Moreover, a controller 203 is coupled to the communication cable 202. The controller 203 is further coupled to a balance 205 though a communication cable 205. Each electronic cash register 201 is coupled to a printer 208 through a cable 207. A keyboard 204 is coupled to the controller 203.

FIG. 21 is an illustration of the controller keyboard 204 according to the eighth embodiment.

Figure 22:
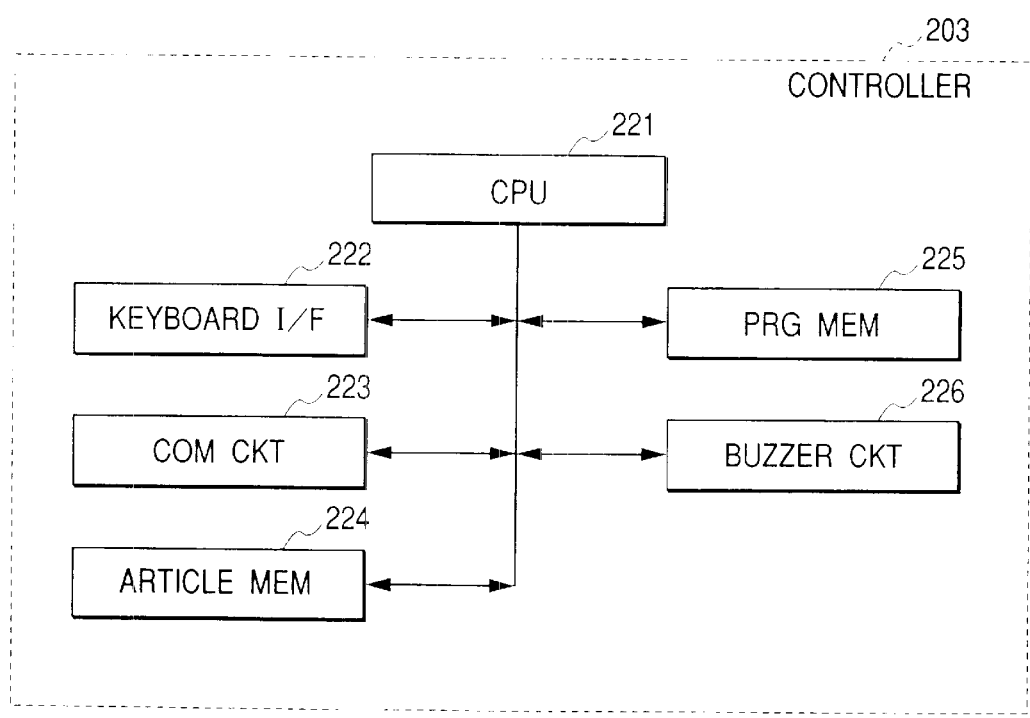
FIG. 22 is a block diagram of the controller according to the eighth embodiment.

FIG. 22 is a block diagram of the controller 203. The controller 203 includes a program memory 225 for storing programs of operating the controller 203, a cpu 221 for effecting controlling in accordance with the programs in the program memory 225, a keyboard interface 222 for interfacing with the keyboard 204, an article memory 224 for storing data of articles, a communication circuit 223 for communicating with the balance 206 and the electronic cash registers 201, and a buzzer circuit 226.

The electronic cash register 201 correspondingly stores the total weight data and the order number in the total weight memory 24 in response to the subtotal key in the same way as the second embodiment.

Moreover, the calculated total weight data and the order number data is transmitted to the controller 203 through the communication cable 202 in response to the take in or take-out keys. The controller 203 stores the received total weight and the order number In the article memory 224.

When the operator has prepared the ordered articles and packages them in a bag, the operator puts the bag on the plate of the balance 206 to measure the weight. In addition, the operator inputs the order number with the controller keyboard 222 as in the same manner as described in the second embodiment and depresses the "measure" key 2101. The controller 203 reads the total weight corresponding to the inputted order number from the article memory 224 and receives the measured weight from the balance 206. The cpu 221 compares the read total weight with the measured weight from the balance 206. If the read total weight substantially disagrees with the measured weight, the cpu 221 operates the buzzer circuit 226 to inform an error.

If the buzzer circuit 226 does not generate the error sound, the operator gives the ordered articles packaged in the paper bag. If the buzzer circuit 226 generates the error sound, the operator checks the articles in the bag and packages correct articles again. Then, the operator measures the packaged articles again and if there in no error sound, the operator gives the customer the paper bag.

Figure 23:
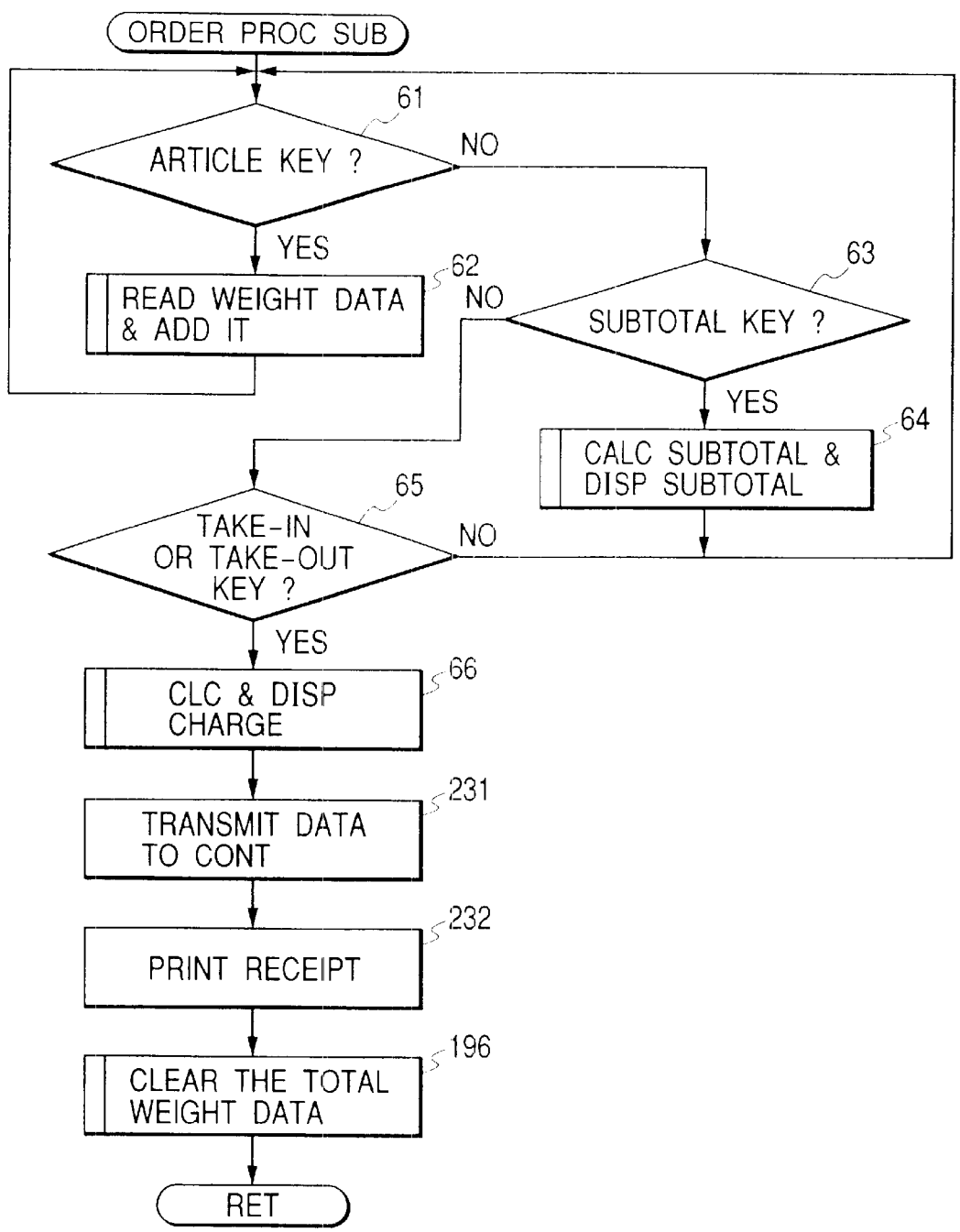
FIG. 23 depicts a flow chart of the eighth embodiment showing the operation of the electronic cash register according to the eighth embodiment.

FIG. 23 depicts a flow chart of the eighth embodiment showing the operation of the electronic cash register of the eighth embodiment. The basic operation is the same as that of the fifth embodiment (FIG. 13B). The difference is as follows:

After processing of the step 65, in step 231, the cpu 21 transmits the data stored in the total weight memory 24, i.e., total weight and the order number to the controller 203. The controller 203 stores the transmitted data received by the communication circuit 223.

In step 232 the cpu 21 prints a receipt without calculated total weight. In the following step 196, the cpu 21 clears the total weight data.

FIGS. 24A and 24B depict flow charts of the eighth embodiment showing the operation of the controller 203 of the eighth embodiment.

In FIG. 24A, the controller 203 checks whether there is communication from an electronic cash register 201 in step 2401. If there is communication, in step 2402, the controller 203 receives the data transmitted from the electronic cash register 201 in step 231 in FIG. 23 and stores the received data in the article memory 224.

In FIG. 24B, the key interruption operation is executed in response to key input of the controller keyboard 204. In step 241, if the depressed key is one of numeric keys, the cpu 21 generates order number data. Actually, the cpu 221 generates digit data in response to each depression of numeric key. That is, if the order number data includes four digits, the cpu 21 generates the order number data in response to depression of the numeric keys four times.

In step 242, if the depressed key is the measuring key 2101, the cpu 221 reads the calculated total weight and order number from the article memory 224. Next, the cpu 221 requests the balance 206 through the communication cable 205 to measure the weight of the bag including the ordered articles and receives the measured weight from the balance 206 through the communication cable 205 in the following step 244.

In step 245, if the measured weight substantially agrees with the calculated total weight, processing proceeds to step 247 and if the measured weight substantially disagrees with the calculated total weight, processing proceeds to step 246. In step 247, the cpu 221 clears the order number and the calculated weight in the article memory 224 and waits the next operation.

In step 246, the cpu 221 generates the error sound to inform the operator of the erroneously packaging the articles and waits the weight checking operation after correctly packaging the ordered articles.

As mentioned above, weight comparison is effected in the controller 203 and the weight comparison operation does not obstacle the operation of the electronic cash register. Moreover, one balance 206 is commonly used to process the orders received by a plurality of electronic cash registers 201.

Ninth Embodiment

FIG. 25 is a block diagram of the electronic cash register system according to a ninth embodiment.

The electronic cash register system according to the ninth embodiment has substantially the same structure as that of the eighth embodiment. The difference is that the bar code reader 251 is provided to the controller 252 to read an order number printed on a receipt.

The order number printed on a receipt is read by the bar code reader 251. The order number is printed such that the most significant digit represents the number of the electronic cash register 201 receiving the order and the following three digits represents an order number in the electronic cash register 201. The operator operates the keyboard of the electronic cash register 201 to generate the order number data.

However, it is also possible to automatically generate the order number data as follows:

These three-digit order number is reset once a day, for example, at opening time of the shop. Then, the three-digit number increases automatically in response to reception of each order.

FIG. 26 is an illustration of the ninth embodiment showing data printed on a receipt.

Figure 27:
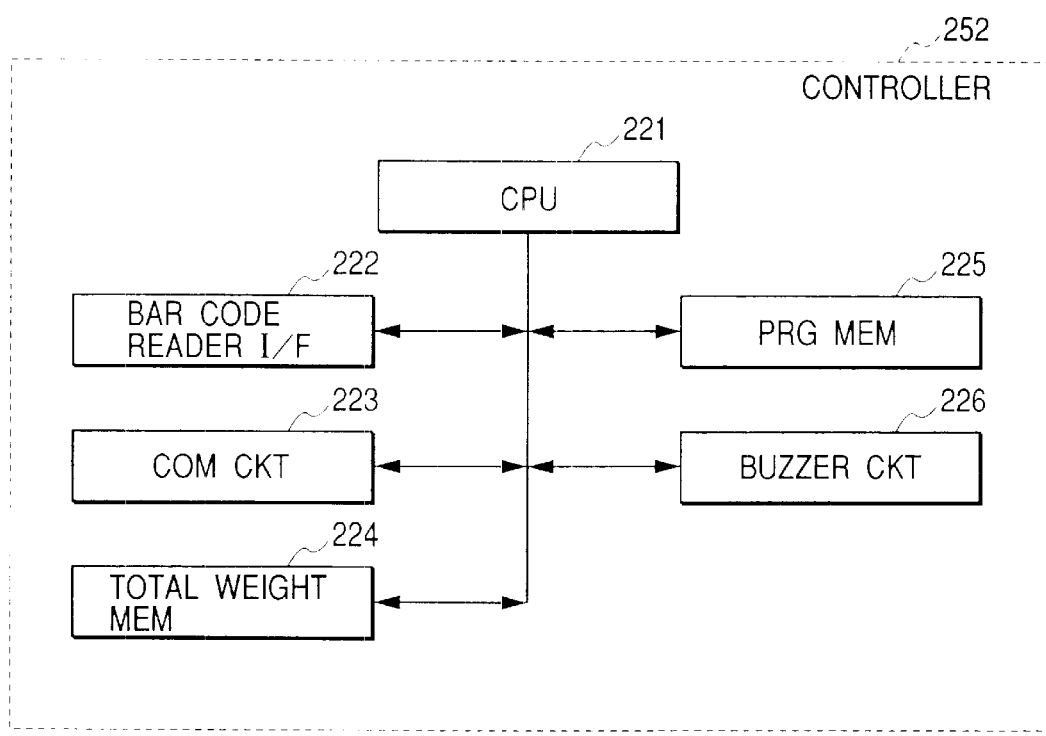
FIG. 27 is a block diagram of the controller according to the ninth embodiment.

FIG. 27 is a block diagram of the controller 252 according to the ninth embodiment.

Figure 28A:
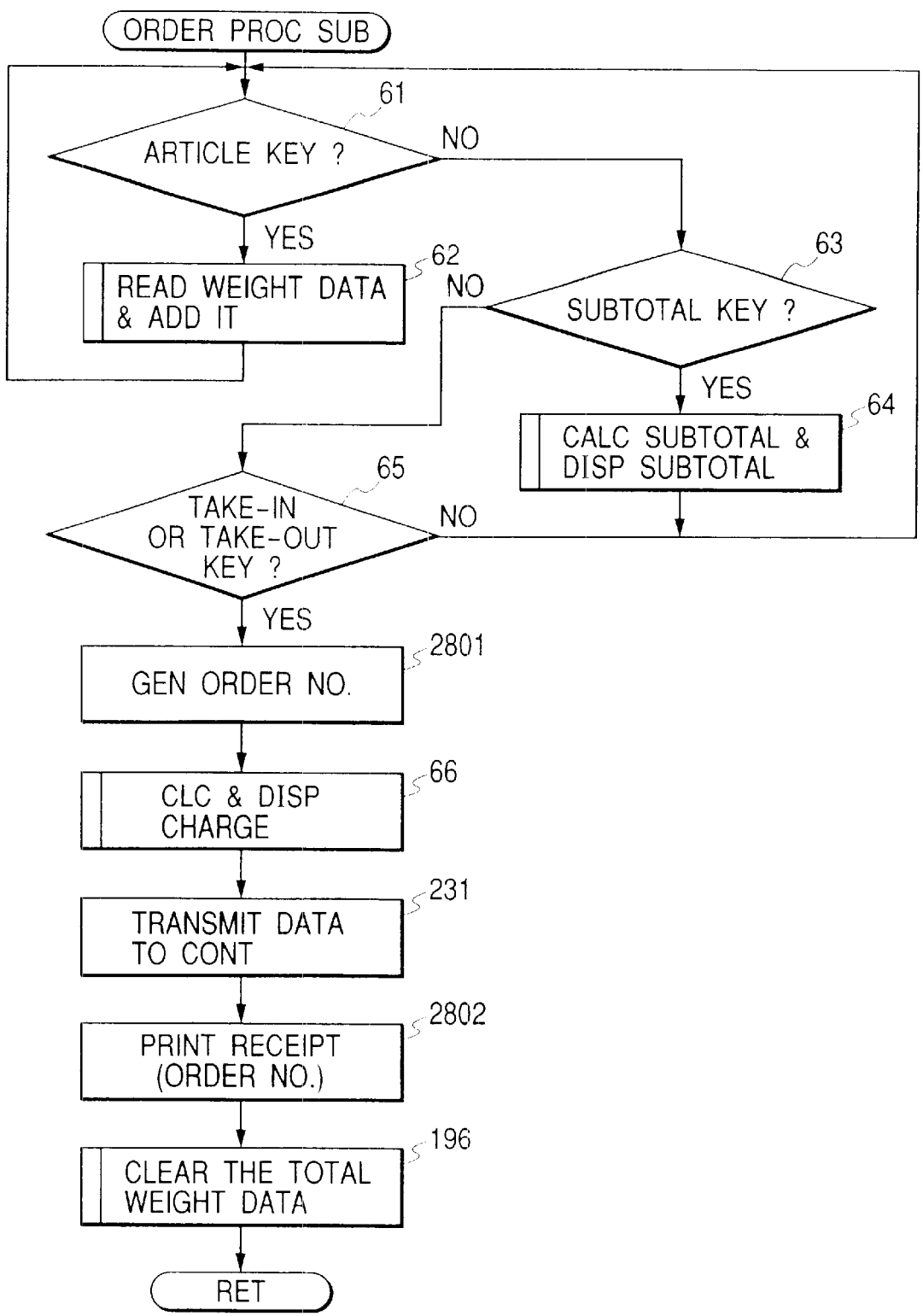
FIG. 28A depicts a flow chart of the electronic cash register according to the ninth embodiment.

FIG. 28A depicts a flow chart of the ninth embodiment showing the operation of the electronic cash register 201 of the ninth embodiment.

The operator operates the keyboard of the electronic cash register 201 to generate the order number data in the same manner as the eighth embodiment as shown in FIG. 28A. That is, if the answer in step 65 is YES, in step 2801, the cpu 21 generates an order number data. When a receipt is printed in step 2802, the cpu 21 prints the order number on the receipt with bar codes as shown in FIG. 26.

When the ordered articles have been prepared, the operator packages the articles in a paper bag and puts the paper bag on the balance 206. Next, the operator operates the bar code reader 251 to read the order number printed on the receipt.

Figure 28B:
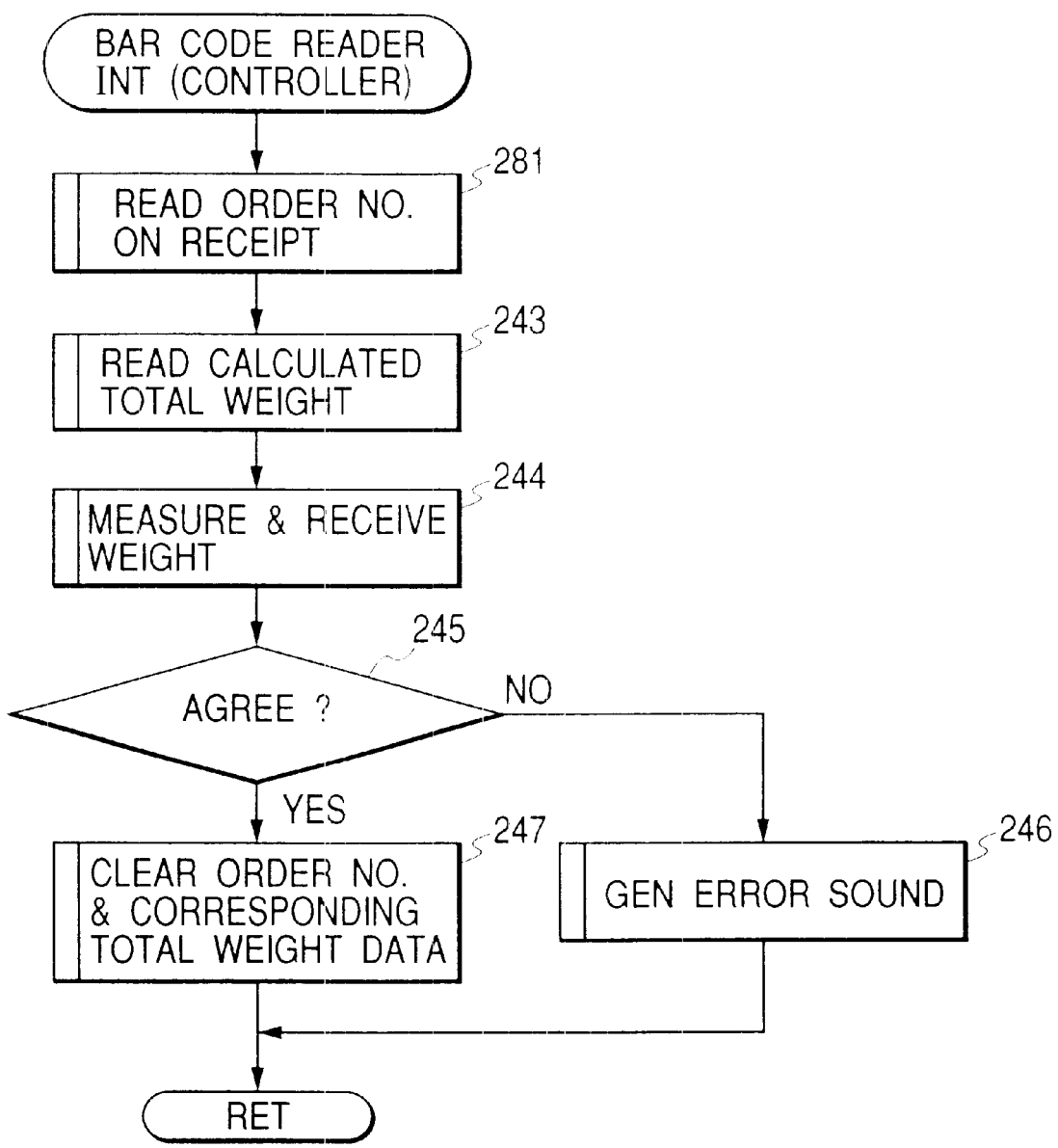
FIG. 28B depicts a flow chart of the controller according to the ninth embodiment.

FIG. 28B depicts a flow chart of the ninth embodiment showing the operation of the controller 252 of the ninth embodiment.

This interruption operation is executed in response to operation of the bar code reader 251. In step 281, cpu 221, reads the order number printed on the receipt through the bar code reader interface 222. In step 243, the cpu 221 reads the calculate total weight and order number from the article memory 224 which has been received and stored in step 2403 and 2403 in FIG. 24A. Next, the cpu 221 requests the balance 206 through the communication cable 205 to measure the weight of the paper bag including the prepared articles and receives the measured weight from the balance 206 through the communication cable 205 in the following step 244.

If the measured weight substantially agrees with the calculated total weight, processing proceeds to step 247 and if the measured weight substantially disagrees with the calculated total weight, processing proceeds to step 246. In step 247, the cpu 221 clears the order number and the calculated weight in the article memory 224 and waits the next operation.

In step 246, the cpu 221 generates the error sound to inform the operator of the erroneously packaging the articles and waits the weight checking operation after correctly packaging the ordered articles.

As mentioned above, the order number is read by the bar code reader 251. Thus, it is possible to prevent an error in inputting the order number.

Tenth Embodiment

FIG. 29 is a block diagram of the electronic cash register system according to a tenth embodiment.

The electronic cash register system according to the tenth embodiment has substantially the same structure as that of the eighth embodiment. The difference is that a monitor display 292 is further provided and is coupled to the controller 293 to display the ordered articles at a unit of order. On the other hand, printers are omitted.

FIG. 31 is an illustration of the tenth embodiment showing the displayed image on the monitor display 292.

In FIG. 31, the ordered articles are displayed every order number, that is, orders #1234, #1264, and #1265. A cursor is displayed with the order number (#1234) on the image 311 to indicate the order (#1234) is under processing.

FIG. 30 is an illustration of a controller keyboard 291 according to the tenth embodiment. The controller keyboard 291 includes keys 301 to 303. The key 303 is for measuring weight. The key 301 is for moving the cursor on the monitor display 292 in the left direction and the key 302 is for moving the cursor on the monitor display 292 in the right direction. When the measuring key 303 is depressed after the paper bag including the prepared articles is put on the balance 206. Weight comparison is effected for the order where the cursor exists.

Figure 32A:
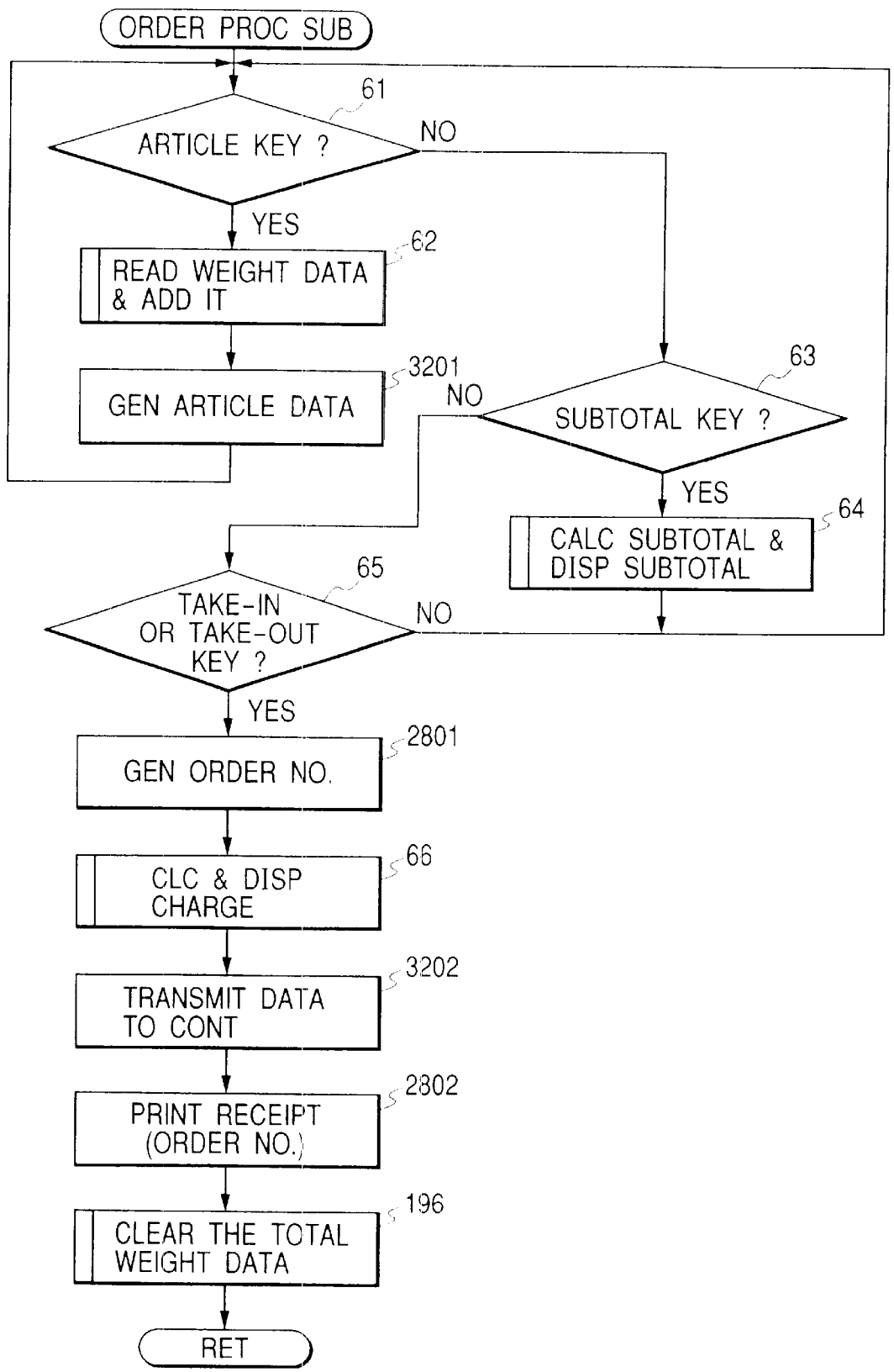
FIG. 32A depicts a flow charts of the electronic cash register according to the tenth embodiment.
Figure 32B:
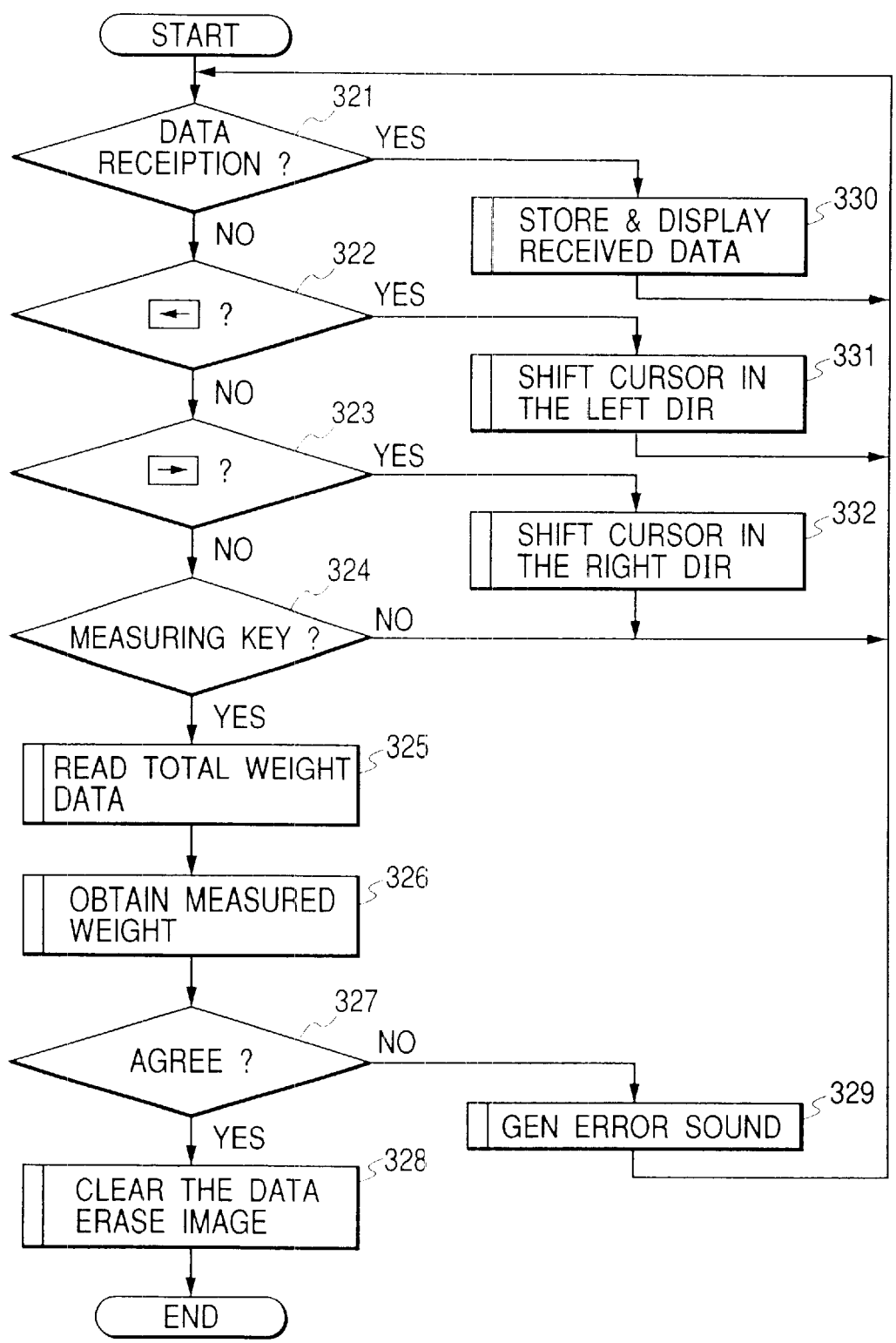
FIG. 32B depicts a flow charts of the controller according to the tenth embodiment.
Figures 33, 34:
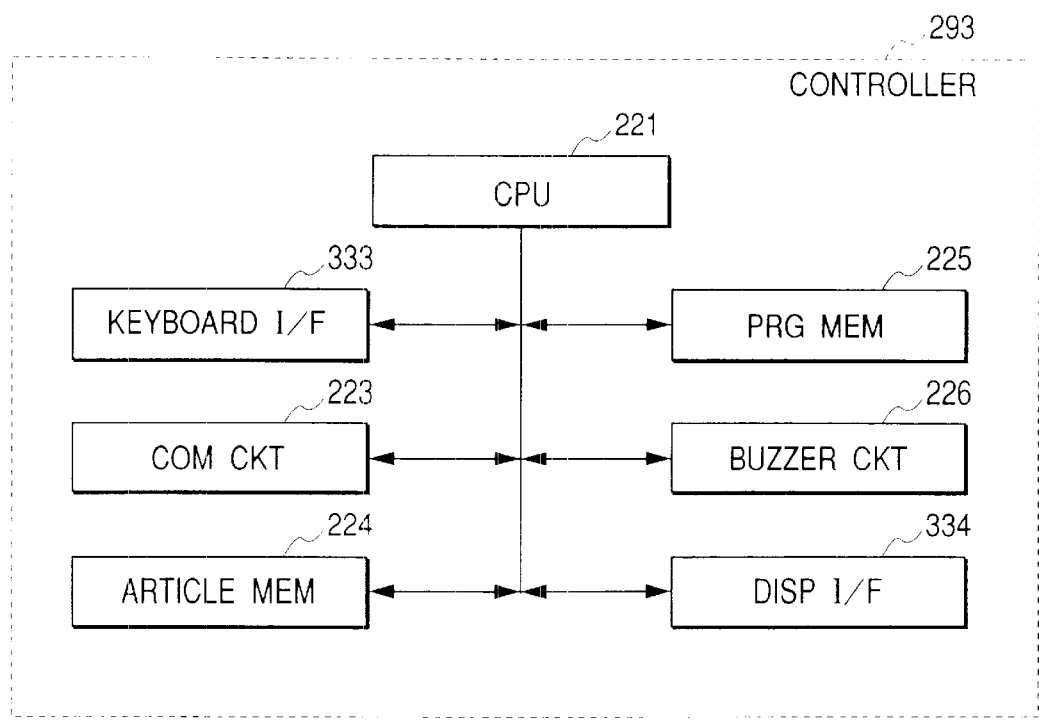
FIG. 33 is a block diagram of the controller according to the tenth embodiment.
FIG. 34 is an illustration of an eleventh embodiment showing the displayed image on the monitor display.

FIG. 33 is a block diagram of the controller 293 according to the tenth embodiment. The controller 293 includes a display interface 334 in addition to the structure of the controller 203 according to the eighth embodiment (FIG. 22). FIG. 32A depicts a flow chart of the tenth embodiment showing the operation of the electronic cash register 201 of the tenth embodiment. FIG. 32B depicts a flow chart of the ninth embodiment showing the operation of the controller 293 of the tenth embodiment.

The operation of the electronic cash register 201 is substantially the same as that shown in FIG. 28A. the difference is as follows:

In FIG. 32A, after step 62, the electronic cash register 201 generate article data including the name of the articles and the number of the articles in response to the article key and stores the article data in the total memory 26. Moreover, after step 3202, in step 2802, the electronic cash register 201 transmits the data including the order number data, article data, and total weight every order to the controller 293 through the communication cable 202. The controller 293 stores the data in the article memory 224 and transmits the data to the monitor display 292 through the display interface 334. The monitor display 292 displays the data. If there are a plurality of orders to be processed, the monitor display 292 displays the articles every order as shown in FIG. 31.

If the kitchen is away from the electronic cash registers 201, the operator, i.e., a cook, cannot watch the display of the electronic cash register 201, so that the monitor display 292 is provided at a suitable position at the kitchen. The operator prepares the articles with reference to the monitor display 292. When the operator has finished preparing, the operator puts the paper bag and depresses the measuring key 303 to compare the total weight with the measured weight.

In FIG. 31, the total weight of the order (#1234) where the cursor is displayed is compared with the measured weight. The total weight of the orders (#1264, #1265) are not compared with the measured weight as shown in the image 213.

When the operator has prepared the articles for the order, the operator selects one of the orders with keys 301 and 302 of the keyboard 291. In response to the key input of the controller keyboard 291, the cpu 221 determines the cursor position and detects the order number indicated by the cursor and changes the position of the cursor on the video monitor 292.

The operator puts the paper bag on the balance 206 and depresses the measuring key 303.

The cpu 221 compares the total weight of the order with the measured weight. If the total weight substantially agrees with the measured weight, the cpu 221 erases the image 311 of the order and if the total weight substantially disagrees with the measured weight, the cpu 221 generates an error sound with the buzzer circuit 226 and waits the next operation.

In processing of the controller 293, the cpu 221 Judges whether data from an electronic cash register is received in step 321. If the data from an electronic cash register is received in step 321, the cpu 221 stores the data including the order number, the ordered articles, the number of articles, and the calculated total weight from the electronic cash register 201 and displays the data as shown in FIG. 31 in step 330.

If the data from an electronic cash register 201 is not received in step 321, the cpu 221 judges whether "←" key 301 is depressed. If the "←" key 301 is depressed, cpu 221 shifts the cursor on the display in the left direction in step 331. In the following step 323, the cpu 221 judges whether "→" key 302 is depressed. If the "→" key 302 is depressed, cpu 221 shifts the cursor on the display in the right direction in step 332. The cpu 221 detects one of order numbers indicated by the position of the displayed cursor.

In the following step 324, the cpu 221 Judges whether "measuring" key 303 is depressed. If the "measuring" key 303 is depressed, processing proceeds to step 325. If the "measuring" key 303 is not depressed, processing returns to step 321.

In step 325, the cpu 221 reads the calculated total weight of the order number indicated by the cursor from the article memory 224. Next, the cpu 221 requests the balance 206 through the communication cable 205 to measure the weight of the paper bag including the prepared articles and receives the measured weight from the balance 206 through the communication cable 205 in the following step 326.

If the measured weight substantially agrees with the calculated total weight, processing proceeds to step 328 and if the measured weight substantially disagrees with the calculated total weight, processing proceeds to step 329. In step 328, the cpu 221 clears the article data, the order number, and the calculated weight in the article memory 224 and waits the next operation. For example, the image 311 in FIG. 31 is erased and images 312 are shifted in the left direction.

In step 329, the cpu 221 generates the error sound to inform the operator of erroneously packaging the articles and waits the weight checking operation after correctly packaging the ordered articles.

As mentioned above, in this system, the operator (cook) can prepare and package the prepared articles with monitoring the video monitor 292, so that an efficiency can be improved.

Eleventh Embodiment

The electronic cash register system according to the eleventh embodiment has substantially the same structure as that of the tenth embodiment. The difference is that the monitor display 292 further displays information of "disagreement".

FIG. 34 is an illustration of the eleventh embodiment showing the displayed image on the monitor display 292.

Figure 35:
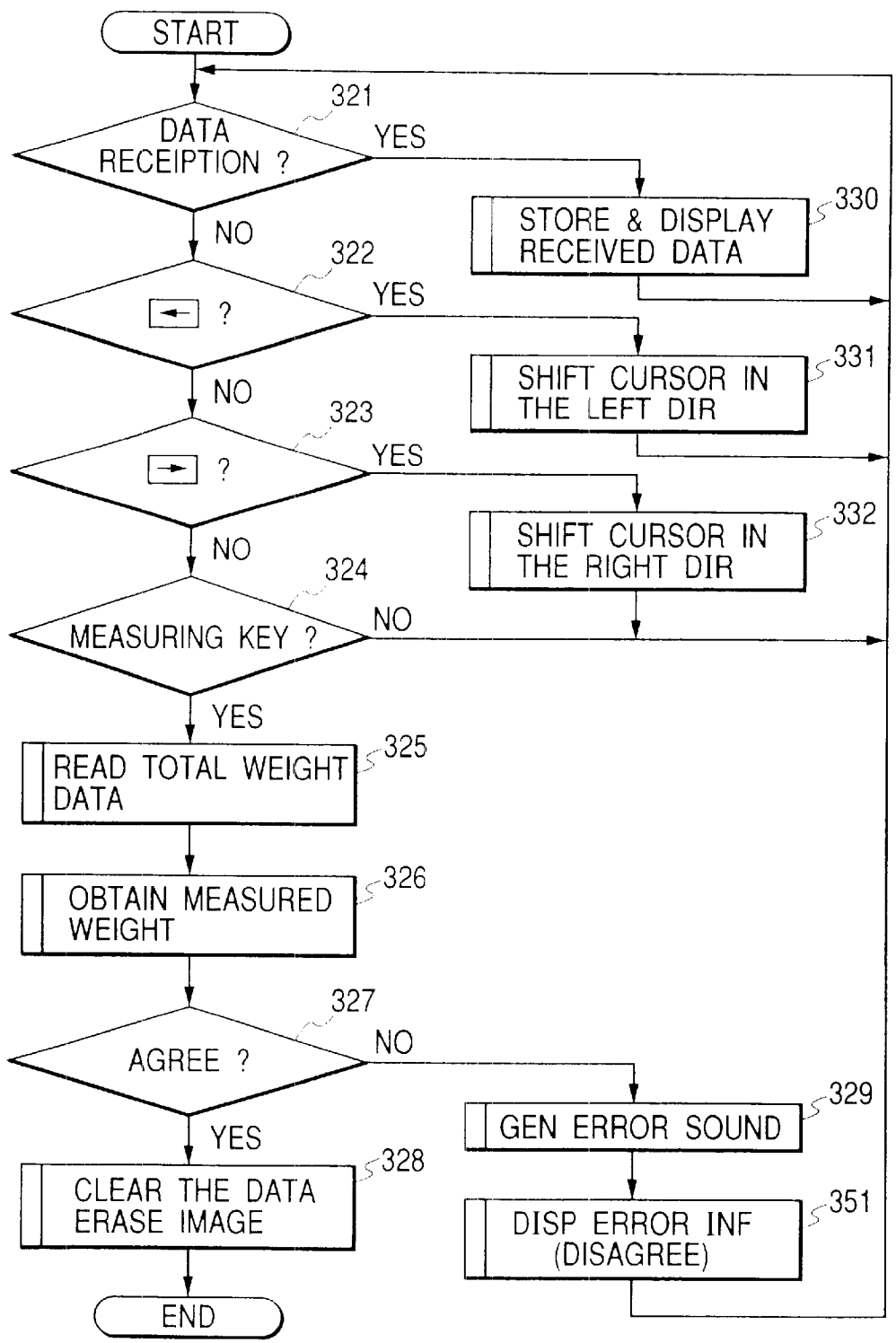
FIG. 35 depicts a flow chart of the eleventh embodiment showing the operation of the controller of the eleventh embodiment.

FIG. 35 depicts a flow chart of the eleventh embodiment showing the operation of the controller of the eleventh embodiment.

The operation of the controller 293 is substantially the same as that of the tenth embodiment. The difference is that step 351 is further provided after step 329 in FIG. 35. That is, the cpu 211 displays error information "DISAGREE" on the monitor display 292 when the total weight substantially disagrees with the measured weight in step 327 in addition to generation of error sound in step 329.

As mentioned above, the error is surely informed to the operator though the operator exists in a noisy circumstance.

Twelfth Embodiment

The electronic cash register system according to the twelfth embodiment has substantially the same structure as that of the eleventh embodiment. The difference is that the monitor display 292 further displays information of disagreement by blinking the image 361 of the order "1234" under processing.

FIG. 36 is an illustration of the twelfth embodiment showing the displayed image on the monitor display 292.

Figure 37:
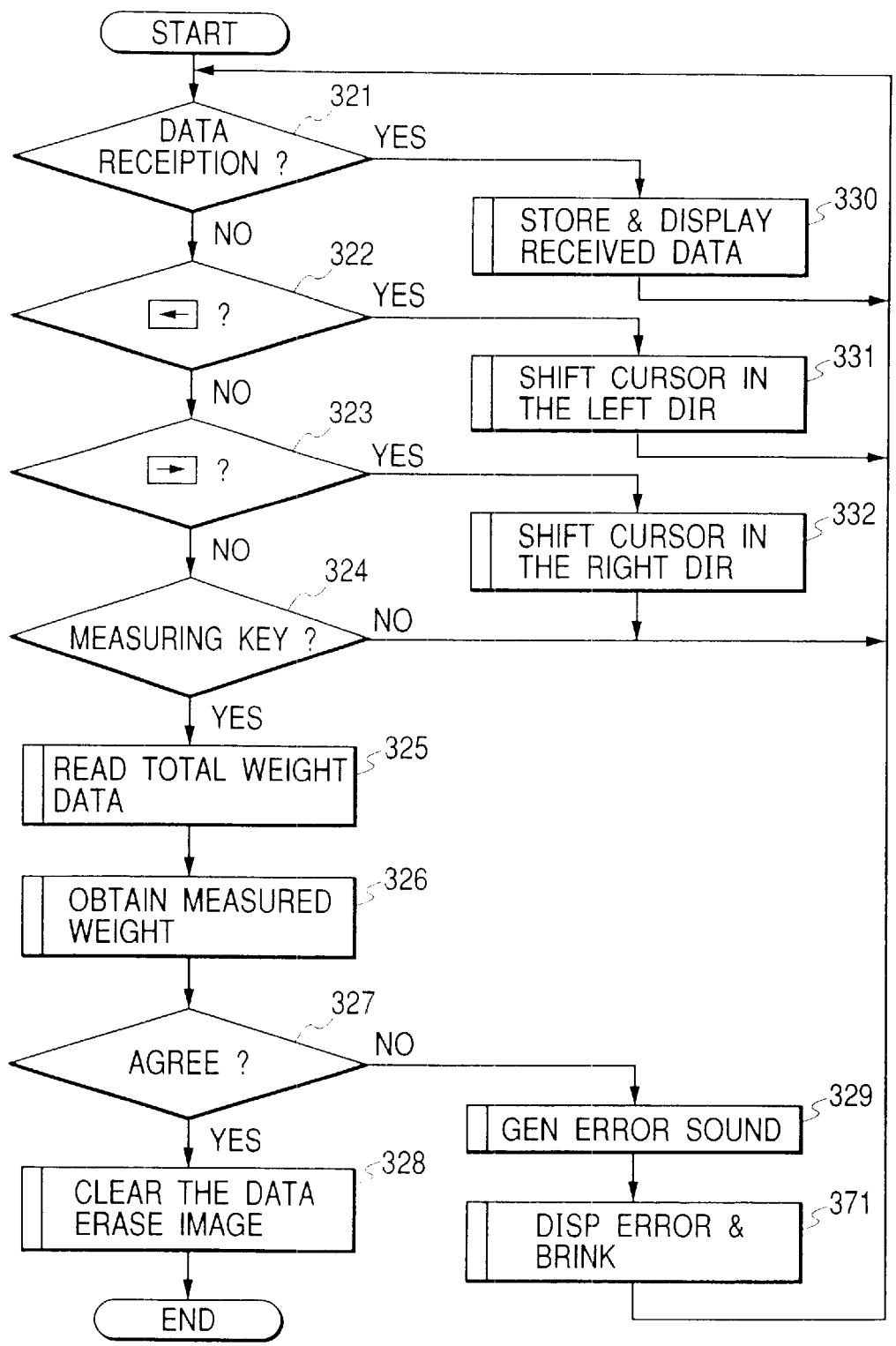
FIG. 37 depicts a flow chart of the twelfth embodiment showing the operation of the controller of the twelfth embodiment.

FIG. 37 depicts a flow chart of the twelfth embodiment showing the operation of the controller of the twelfth embodiment.

The operation of the controller 293 is substantially the same as that of the eleventh embodiment. The difference is that step 371 replaces step 351. That is, the cpu 211 displays the image 361 with blinking the image 361 of the order "#1234" in addition to error information of "DISAGREE" on the monitor display 292 when the total weight substantially disagrees with the measured weight in step 327. More specifically, images of the ordered articles and the image of the "DISAGREEMENT" are blinked as shown in FIG. 36.

As mentioned above, the error is more surely informed to the operator though the operator exists in a noisy circumstance.

Thirteenth Embodiment

The electronic cash register system according to the thirteenth embodiment has substantially the same structure as that of the eleventh embodiment. The difference is that the monitor display 292 further displays information of error amount.

FIG. 38 is an illustration of the thirteenth embodiment showing the displayed image on the monitor display 292.

Figure 39:
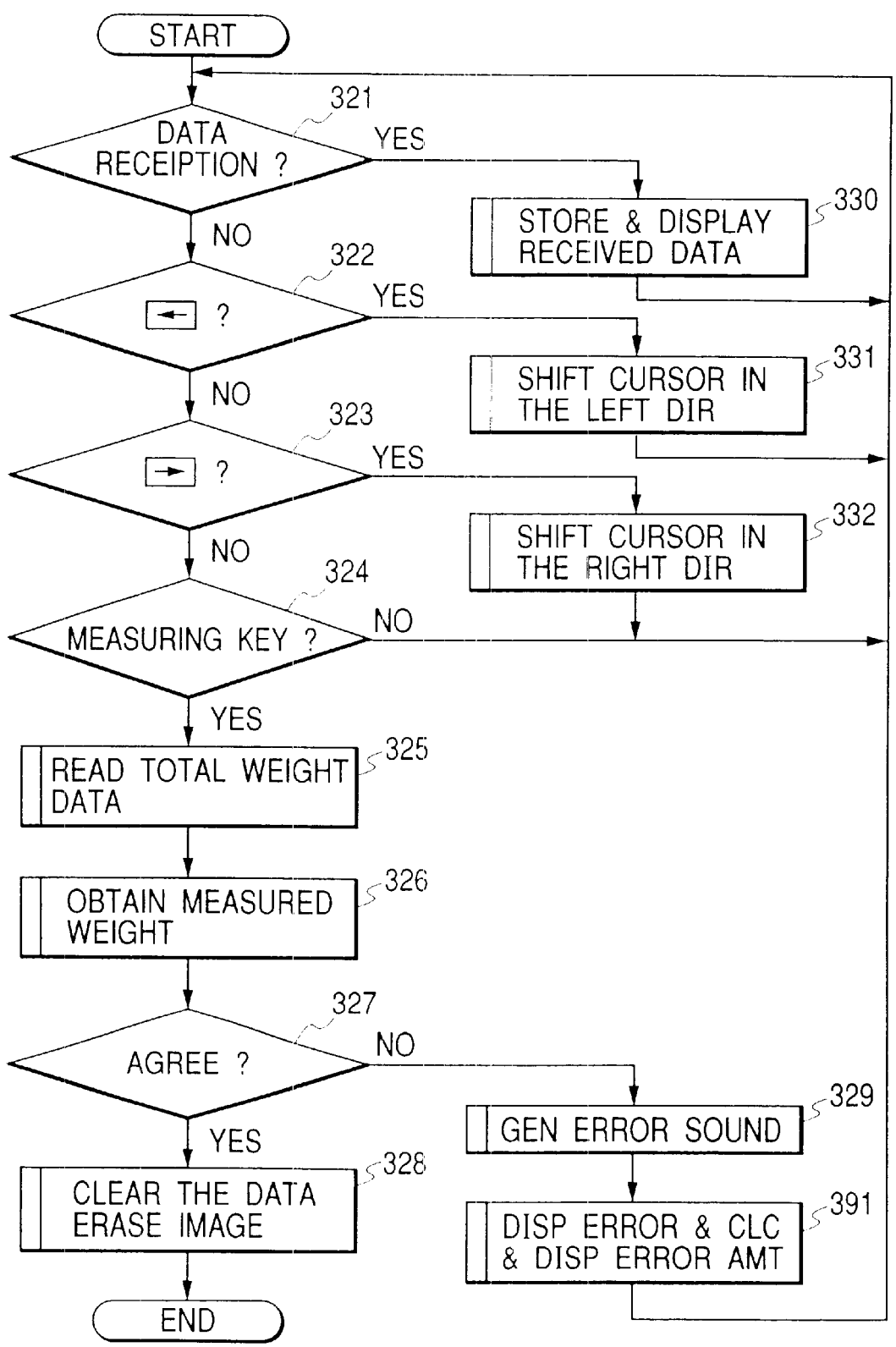
FIG. 39 depicts a flow chart of the controller according to the thirteenth embodiment.

FIG. 39 depicts a flow chart of the thirteenth embodiment showing the operation of the controller 293 of the thirteenth embodiment.

The operation of the controller 293 is substantially the same as that of the eleventh embodiment. The difference is that step 391 is further provided. That is, the cpu 211 displays the error information of "DISAGREEMENT" on the monitor display 292 when the total weight substantially disagrees with the measured weight in step 327. Moreover, the cpu 211 calculates an error amount in weight between the total weight and the measured weight and displays the error amount on the monitor display 292 as shown in FIG. 38.

As mentioned above, from the error amount, the operator can presume that the error is caused by that different article was prepared when the error amount is small. On the other hand, when the error amount is large, the operator can judge that the error is caused by that the number of prepared articles is different. Thus, the checking interval can be shortened.

Fourteenth Embodiment

The electronic cash register system according to the fourteenth embodiment has substantially the same structure as that of the eleventh embodiment. The difference is that the electronic cash register 201 stores addition flag as the same as that of the third embodiment in the setting table as shown in FIG. 10 and the electronic cash register 201 transmits the addition flag in addition to the article data and the total weight to the controller 293 with correspondence. The controller 293 further displays the addition flag with a predetermined symbol, e.t.c., with correspondence with the article and the predetermined symbol.

FIG. 40 is an illustration of the fourteenth embodiment showing the displayed image on the monitor display 292.

Figure 41:
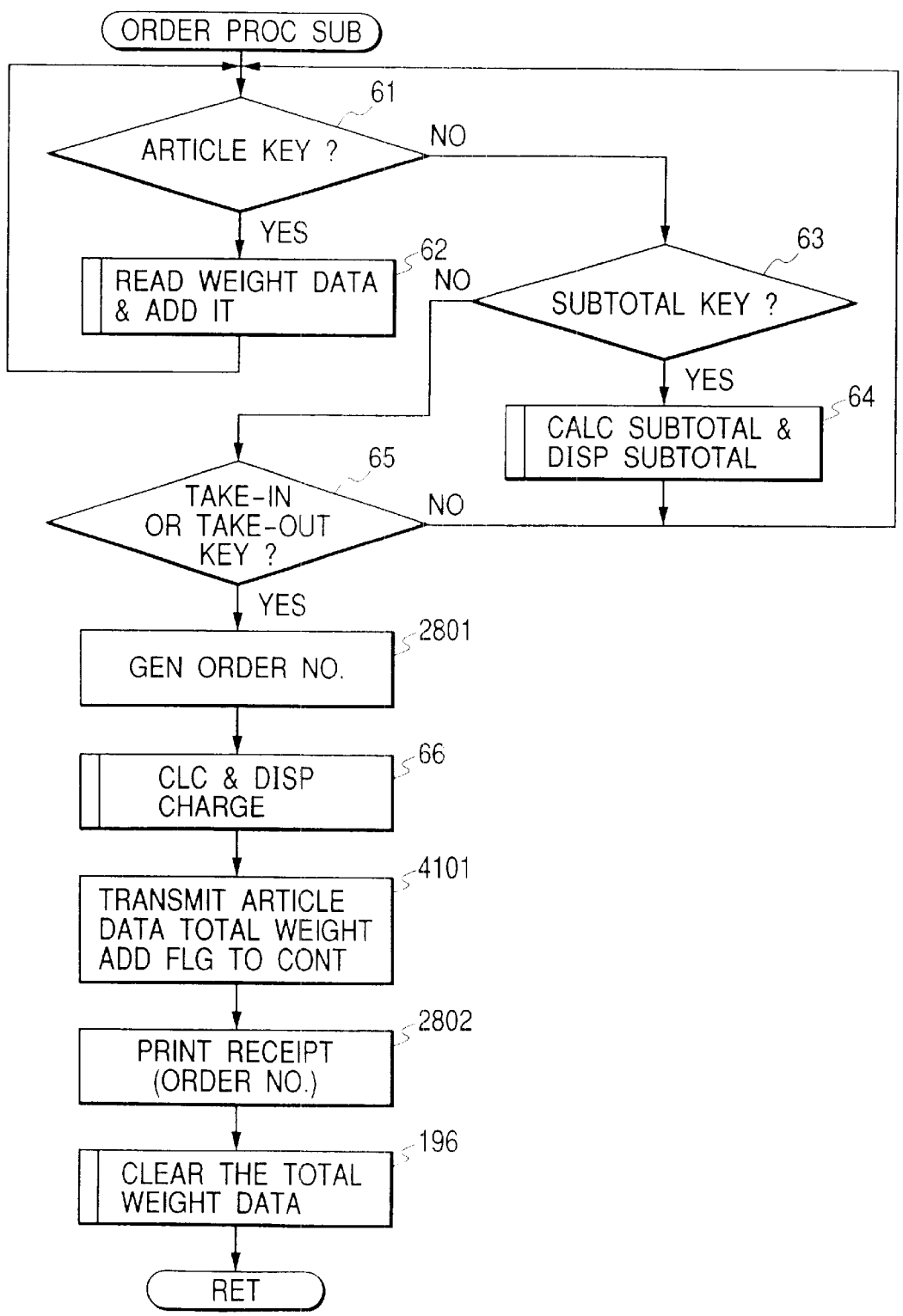
FIG. 41 depicts a flow chart of the electronic cash register according to the fourteenth embodiment.

FIG. 41 depicts a flow chart of the fourteenth embodiment showing the operation of the electronic cash register 201 of the fourteenth embodiment.

Figure 42:
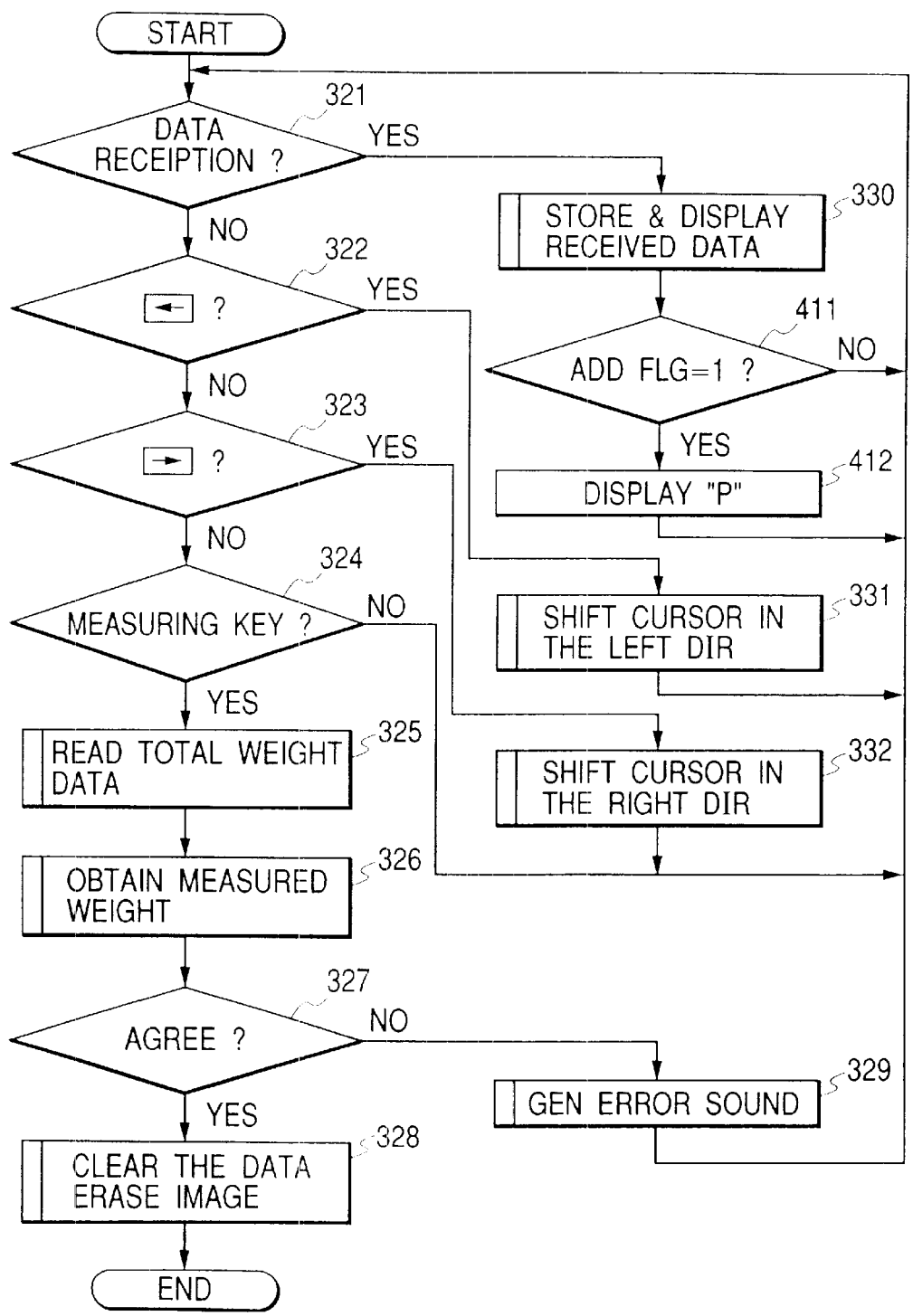
FIG. 42 depicts a flow chart of the fourteenth embodiment showing the operation of the controller of the fourteenth embodiment.

FIG. 42 depicts a flow chart of the fourteenth embodiment showing the operation of the controller 293 of the fourteenth embodiment.

The operation of the electronic cash register 201 substantially the same as that of the eleventh embodiment. The difference is that the electronic cash register 201 transmits the addition flag to the controller 293 in addition to the article data and the total weight in step 4101 in FIG. 41.

The operation of the controller 293 is substantially the same as that of the eleventh embodiment. The difference is that steps 411 and 412 are further provided. That is, the cpu 211 displays a symbol 401 of "P" indicative of addition flag when the addition flag is attached to the article data in step 411 as shown in FIG. 40. If no addition flag is attached to the article data in step 411, the cpu 211 displays no symbol just after the displayed article on the display 292.

The operator (cook) packages only prepared articles indicated by "P" in a paper bag. Thus, the interval for preparing the bag can be shortened.

What is claimed is:

1. An electronic cash register system comprising:

a keyboard including article keys indicative of articles;

article input key start and end detection means responsive to actuation of selected keys at said keyboard for detecting start and end of inputting operations of said article keys for every order;

data storing means for storing weight data of said articles, said weight data having correspondence to said article keys, respectively;

total weight calculating means for reading said weight data in response to each of said article keys and said article key input start and end detection means and for calculating a total of said read weight data;

weight measuring means for measuring weight of an object;

comparing means for comparing said weight with said total; and informing means for informing an operator of an error when said weight of said object substantially disagrees with said total;

said electronic cash register system further comprising:

order number generating means for generating different order number data in response to said article input key start and end detection means, repeatedly;

storing means responsive to said article input key start and end detection means for repeatedly storing said total and said order number data to store a plurality of sets of totals and order number data;

order number input means for inputting an order number;

detecting means for detecting that one of said sets of which order number data agrees with said inputted order number; and reading means for reading said total of said detected set, wherein said informing means informs said operator of said error when said weight of said object substantially disagrees with said total of said detected set.

2. An electronic cash register system as claimed in claim 1, comprising:

printing means for printing said total on a sheet.

3. An electronic cash register system as claimed in claim 2, wherein said printing means prints said total on said sheet with bar codes, said electronic cash register system further comprising a scale unit including:

bar code reading means for reading said bar codes to generate bar code data;

weight measuring means for measuring an weight of an object;

comparing means for comparing said weight with said bar code data from said bar code reading means; and informing means for informing an operator of an error when said weight of said object substantially disagrees with said bar code data from said receiving means.

4. An electronic cash register system as claimed in claim 2, wherein said printing means prints said total with bar codes, said electronic cash register system further comprising:

bar code data reading means for reading said printed bar codes to generate bar code data;

a scale unit including;
  weight measuring means for measuring weight of an object; and
  transmitting means for transmitting said weight;
receiving means for receiving said transmitted weight;
comparing means for comparing said received weight with said bar code data; and
informing means for informing an operator of an error when said received weight substantially disagrees with said bar code data.

5. An electronic cash register system comprising:
a keyboard including article keys indicative of articles;
article input key start and end detection means responsive to actuation of selected keys at said keyboard for detecting start and end of inputting operations of said article keys for every order;
data storing means for storing weight data of said articles, said weight data having correspondence to said article keys, respectively;
total weight calculating means for reading said weight data in response to each of said article keys and said article key input start and end detection means and for calculating a total of said read weight data;
weight measuring means for measuring weight of an object;
comparing means for comparing said weight with said total; and
informing means for informing an operator of an error when said weight of said object substantially disagrees with said total;
wherein said data storing means further stores flag data with correspondence with said weight data of said articles, respectively, said flag data indicating whether or not said stored weight data is a target of said total, and said total weight calculating means effects addition of said weight data to calculate said total when said flag data indicates that said weight data is said target.

6. An electronic cash register system comprising:
a keyboard including article keys indicative of articles;
article input key start and end detection means responsive to actuation of selected keys at said keyboard for detecting start and end of inputting operations of said article keys for every order;
data storing means for storing weight data of said articles, said weight data having correspondence to said article keys, respectively;
total weight calculating means for reading said weight data in response to each of said article keys and said article key input start and end detection means and for calculating a total of said read weight data;
weight measuring means for measuring weight of an object;
comparing means for comparing said weight with said total; and
informing means for informing an operator of an error when said weight of said object substantially disagrees with said total;
said electronic cash register system further comprising excluding command inputting means for inputting a total calculation excluding command, wherein said total weight calculating means excludes, in calculating said total, said weight data having correspondence to one of said article keys which is operated in relation to operation of said excluding command inputting means.

7. An electronic cash register system comprising:
an electronic cash register including:
  a key board including article keys indicative of articles to be dealt with;
  article input key star and end detection means responsive to actuation of selected keys at said key board for detecting start and end of inputting operations of said articles keys for every order;
  data storing means for storing weight data of said articles;
  total weight calculating means for reading said weight data in response to each of articles keys and said article key input start and end detection means and for calculating a total of said read weight data; and
  first transmitting means for transmitting said total;
a scale unit including:
  weight measuring means for measuring an weight of an object; and
  second transmitting means for transmitting said weight; and
a controller including:
  receiving means for receiving said transmitted total and said transmitted weight;
  comparing means for receiving said received weight with said received total; and
  outputting means for outputting a comparing result of said comparing means; and
display means;
wherein said outputting means said comparing result and said display means displays an error message in accordance with said comparing result when said received weight substantially disagrees with said received total;
wherein said electronic cash register further comprises:
  order number generating means for generating different order number data in response to said article input key start and end detection means, repeatedly;
  first storing means responsive to said article input key start and end detection means for repeatedly storing a set of said total and said order number data to store a plurality of sets of said totals and said order number data;
  printing means for printing said different order number with bar codes on a sheet in response of said order number generating means, repeatedly, said order number data from said first storing means, wherein said controller further comprises:
    bar code reading means for reading said bar codes on said sheet to output bar code data, said receiving means receiving a plurality of sets of said totals and said order number data from said first transmitting means; and
    second storing means for storing a plurality of sets of said totals and said order number data from receiving means;
    detecting means for detecting that one of said sets of which order number data agrees with said bar code data; and
    reading means for reading said total of said detected set from said second storing means, wherein said comparing compares said transmitted weight with said total of said detected set.

8. An electronic cash register system as claimed in claim 7, wherein said display means displays said error message on a screen and blinks at least a portion of said screen when said received weight substantially disagrees with said received total.

9. An electronic cash register system as claimed in claim 7, wherein said controller further comprises subtractor for obtaining a difference between said received weight and said received and said display means further displays said difference.

10. An electronic cash register system comprising:
   an electronic cash register including:
      a key board including article keys indicative of articles to be dealt with;
      article input key start and end detection means responsive to actuation of selected keys at said keyboard for detecting start and end of inputting operations of said article keys for every order;
      data storing means for storing weight data of said articles;
      total weight calculating means for reading said weight data in response to each of article keys and said article key input start and end detection means and for calculating a total of said read weight data; and
      first transmitting means for transmitting said total;
   a scale unit including:
      weight measuring means for measuring an weight of an object; and
      second transmitting means for transmitting said weight;
   a controller including:
      receiving means for receiving said transmitted total and said transmitted weight;
      comparing means for comparing said received weight with said received total; and
      outputting means for outputting a comparing result of said comparing means; and
   display means;
   wherein said outputting means outputs said comparing result and said display means displays an error message in accordance with said comparing result when said received weight substantially disagrees with said received total;
   wherein said electronic cash register further comprises:
      order number generating means for generating different order number data in response to said article input key start and end detection means, repeatedly;
      article data generation means for generating article data in response to said article keys;
      first storing means responsive to said article input key start and end detection means for repeatedly storing a set of said article data, said total, and said order number data to store a plurality of sets of said article data, said totals, and said order number data, said first transmitting means transmitting a plurality of sets of said article data, said totals, and said order number data from said first storing means; and
      said receiving means receiving a plurality of sets of said article data, said totals, and said order number data from said first transmitting means; said controller further comprises:
         second storing means for storing a plurality of sets of said article data, said totals, and said order number data from said receiving means; and
         display means for displaying a plurality of sets of said article data, said totals, and said order number data from said second storing means.

11. An electronic cash register system as claimed in claim 10, wherein said data storing means further stores flag data with correspondence with said weight data respectively, said flag data indicating whether or not said stored weight data is a target of said total, said first storing means further stores said flag data such that in each of said sets, said flag data is stored with correspondence with said article data, said second storing means stores a plurality of sets of said article data, said flag data, said totals, and said order number data from said first storing means which are received by said receiving means, said display means displays a plurality of sets of said article data, said flag data with a predetermined image, and said order number data from said second storing means, whereby said predetermined image indicates that said article indicated by said article data should be packaged.

* * * * *

UNITED STATES PATENT AND TRADEMARK OFFICE
CERTIFICATE OF CORRECTION

PATENT NO. : 6,687,680 B1
DATED : February 3, 2004
INVENTOR(S) : Kesayoshi Iguchi et al.

It is certified that error appears in the above-identified patent and that said Letters Patent is hereby corrected as shown below:

Column 22,
Line 5, "star" should be -- start --
Line 45, after "repeatedly," insert -- said first transmitting means transmitting a plurality of sets of said totals and --

Signed and Sealed this

Thirteenth Day of July, 2004

JON W. DUDAS
*Acting Director of the United States Patent and Trademark Office*